(12) United States Patent
Lee

(10) Patent No.: US 9,141,214 B2
(45) Date of Patent: Sep. 22, 2015

(54) DATA INPUT DEVICE

(76) Inventor: Ju Hyup Lee, Suwon-si (KR)

(*) Notice: Subject to any disclaimer, the term of this patent is extended or adjusted under 35 U.S.C. 154(b) by 0 days.

(21) Appl. No.: 13/805,771

(22) PCT Filed: Jul. 5, 2011

(86) PCT No.: PCT/KR2011/004905
§ 371 (c)(1),
(2), (4) Date: Dec. 20, 2012

(87) PCT Pub. No.: WO2012/005493
PCT Pub. Date: Jan. 12, 2012

(65) Prior Publication Data
US 2013/0100062 A1 Apr. 25, 2013

(30) Foreign Application Priority Data

Jul. 6, 2010 (KR) .................. 10-2010-0065103

(51) Int. Cl.
*G06F 3/041* (2006.01)
*G06F 3/023* (2006.01)
*G06F 3/0488* (2013.01)

(52) U.S. Cl.
CPC .............. *G06F 3/041* (2013.01); *G06F 3/0234* (2013.01); *G06F 3/04886* (2013.01)

(58) Field of Classification Search
CPC ..... G06F 3/0338; G06F 3/041; G06F 3/0234; G06F 3/04886; G06F 3/0488; G06F 3/04883; G06F 3/044
USPC ....................................... 345/161; 463/37–38
See application file for complete search history.

(56) References Cited

U.S. PATENT DOCUMENTS

| | | | |
|---|---|---|---|
| 2006/0181517 A1* | 8/2006 | Zadesky et al. | 345/173 |
| 2008/0158162 A1* | 7/2008 | Ahn | 345/168 |
| 2010/0134428 A1* | 6/2010 | Oh | 345/173 |
| 2010/0302016 A1* | 12/2010 | Zaborowski | 340/407.2 |

FOREIGN PATENT DOCUMENTS

| | | |
|---|---|---|
| JP | 2005-044122 A | 2/2005 |
| KR | 20-0304005 Y1 | 1/2003 |
| KR | 10-2006-0119527 A | 11/2006 |
| KR | 10-2009-0096377 A | 9/2009 |
| KR | 10-2009-0110722 A | 10/2009 |

OTHER PUBLICATIONS

International Search Report for PCT Application No. PCT/KR2011/004905 filed Jul. 5, 2011.

* cited by examiner

*Primary Examiner* — Towfiq Elahi
(74) *Attorney, Agent, or Firm* — LRK Patent Law Firm

(57) ABSTRACT

A data input device and method are provided. The data input device provides an input module, which may be applied to electronic devices or portable terminals, consisting of a number of separation pairs, and the input module includes a number of A separated indication positions and a number of B separated indication positions which are disposed as each A-B type based on a predetermined separation reference line, in two sides, that is, an A separated segment and a B separated segment which are ambilaterally divided based on the separation reference line, so that a data input may be individually or continuously performed by means of an input selection to the one or more separated indication positions.

18 Claims, 26 Drawing Sheets

(a)

(b)

(c)

(d)

DATA INPUT DEVICE

TECHNICAL FIELD

The present invention relates to a data input device and method, wherein a number of separation pairs corresponding to input selecting positions of an input unit are respectively disposed as an A-B type based on one separation reference line, so that a data input is individually or continuously performed by means of an input selection to one or more separated indication positions among the separation pairs.

BACKGROUND ART

Recently, electronic devices or portable terminals tend to be further miniaturized and handheld computerized due to a rapid development of hardware and software such as semiconductor technologies, information processing technologies, communication technologies, etc. Therefore, a data input in various kinds of electronic devices or portable terminals gradually becomes more important. However, input devices in these electronic devices or portable terminals have some problems of inputting various kinds of data. For example, a keyboard type input device used in a Personal Computer (PC), a Notebook, a Netbook, etc. has a limit to reduce the size, so that there is a difficulty in miniaturization of the size of the electronic devices.

In addition, an input device of a touch screen type used in a Personal Digital Assistant (PDA), a Smart Phone, etc. has a difficulty in performing works requiring fast speed because its input speed is slow when various kinds of data are inputted during office work, web work, games, etc.

Furthermore electronic devices or portable terminals use a certain part of the screen in a display unit as an input interface at the time of input. Therefore, workability on the display unit screen becomes lower, which causes inconvenience.

Moreover, it is not easy that as soon as a finger is put on an input unit or an input surface of cellular phones, portable terminals, etc., whole input selecting positions of each input key or input button are recognized through a fingertip, so that users feel difficulty in easily and quickly performing a continuous input operation at the time of input.

Besides, when one phoneme or data input is performed in an input device through an one-time input operation, Hangeul, that is, the Korean alphabet, requires more than twenty four input keys or buttons for inputting characters to be arranged on the input device, English does more than twenty six input keys or buttons, and Japanese or other languages does input keys or buttons more than Hangeul or English. In addition, as miniaturized electronic devices or portable terminals are advancing to handheld POs, the electronic devices or portable terminals are increasingly demanded to have an input device which can input all the data of a conventional keyboard including characters, a variety of command keys such as Enter key, Space key, Shift key, Conversion key, etc., function keys (F keys), special keys, specific function keys, symbols, etc. Furthermore, the electronic devices or portable terminals, which are remarkably advancing day by day, are facing a more important problem in which a display unit screen and a configuration of an input device are in proper harmony together while at the same time size adjustment and disposition are achieved. Specifically, although it is preferred that small electronic devices or portable terminals, which are relatively smaller than fixed type electronic devices, configure a display unit screen to be larger as users increasingly make a demand for a larger screen when using multimedia or video data, an input device cannot be provided larger than a predetermined size so as to be suitable for portability.

For this reason, conventional cellular phones or portable terminals are so configured that finger-sized keys or buttons are arranged less than the number in a predetermined formation such as 4×3 or 5×3, etc., and a number of data of Hangeul, English, or other languages are respectively assigned to the input keys or buttons in an overlapping manner, so that users can input a data by repeatedly selecting a corresponding input key several times when inputting desired data.

For example, input methods such as Cheon-Ji-In Hangeul, EZ Hangeul, SKY Hangeul, etc. are developed and used. However, the Cheon-Ji-In Hangeul input method has an advantage that reduces the number of input buttons to which data are assigned because desired data are generated by means of a combination of predetermined basic data, and, conversely, a disadvantage that increases input time and typing errors according to a lengthened moving line because a data input is performed not by means of an input operation having a short moving line in a state in which whole input selecting positions are respectively recognized at the time of data input, but by means of an input operation continuously moving a finger to each corresponding input button among a number of the input buttons untouched to a finger.

In addition, although there has been suggested an input method technique such as a keyboard which can be carried with being rolled up or folded, this input device always carried, thereby causing great inconvenience.

Moreover, there has been suggested an input method technique such as a virtual keyboard performing an input by projecting a keyboard Image onto the position of a predetermined space and sensing input operations of fingers on the image in a three-dimensional way.

However, these kinds of input devices can perform a data input in a predetermined space or designated position only, thereby having a difficulty in being applied to mobile electronic devices which can perform an input work at anytime and anywhere.

As described above, electronic devices or portable terminals are required to make input devices to be more miniaturized or compact so as to be used more conveniently while in motion, and the needs of users to portability and convenience is more and more getting increasing. In other words, there is a growing demand of the input device which can use a whole screen of a display unit better and input the desired data more easily and quickly at the time of input.

Considering such a situation, the electronic devices or portable terminals are required to configure an input device providing an input unit in which en input surface having a number of input selecting positions is recognized as one input unit, and the whole input selecting positions are recognized around the middle of a fingertip when a finger is put on the input unit, so that each of the input selecting positions can be individually or continuously selected in an easy and quick manner by means of a short input moving line of a finger and an input operation according to the position recognition at the time of input.

DISCLOSURE

Technical Problem

Accordingly, the task of the invention is to provide a data input device and method which provides an input module applicable to electronic devices or portable terminals, wherein, the input module is so configured as to provide a number of separation pairs which are disposed as an array of A-B type pairs in which a number of A separated indication positions in an A separated segment and a number of B separated indication positions in a B separated segment are separated from and corresponded each other as a face-to-face type based on a separation reference line, in the two sides, that is, the A separated segment and the B separated segment which are ambilaterally divided based on a separation reference point and the separation reference line, and include an input reference block having three separation pairs which are continuously and adjacently arranged as a left-middle-right type around the separation reference point, so that the input reference block is positioned within the rolling movement range of a fingerprint region of a fingertip and the position of each separation pair of the input reference block is recognized as the positions of a left-middle-right type around the middle of a fingertip, while at the same time the input reference block is recognized as one input block type as soon as a finger is put on the input reference block, so that the input selecting positions disposed outside the input reference block is recognized as the position of each A-B type of the left or right of the input reference block based on the input reference block, and thus, each of the input selecting positions can be individually or continuously selected in an easy and quick manner by means of a short moving line of a finger and an familiar input operation according to the position recognition at the time of input.

Technical Solution

In order to accomplish the above task, a data input device 1 according to an aspect of the invention includes an input module which is provided to a base, wherein the input module includes a number of A-B type separation pairs which are disposed by each one pair along a separation reference line as an array of A-B separated indication positions in which a number of A separated indication positions in an A separated segment and a number of B separated indication positions in a B separated segment are separated from and corresponded each other as a face-to-face type based on the separation reference line, in the two sides, that is, the A separated segment and the B separated segment which are ambilaterally divided from the separation reference line based on a separation reference point which is a reference position within a contact area of a finger as well as the one separation reference line passing through the separation reference point, and the input module includes an input reference block in which three A-B type separation pairs are continuously and adjacently arranged as a left-middle-right type around the separation reference point, so that an input by means of an individual or continuous selection to one or more separated indication positions among the separation pairs is sensed and an input signal corresponding to the input by means of an individual or continuous selection is generated; and a control unit which judges and distinguishes between the input by means of an individual selection and the input by means of a continuous selection from the input signal, and then extracts the data assigned to the distinguished input signal from a memory unit and processes the input, characterized in that the three A-B type separation pairs of the input reference block are positioned within the rolling movement range of a fingerprint region of a thumb tip and the position of each separation pair of the input reference block is recognized as the position of a left-middle-right type around the middle of a fingertip, while at the same time the three A-B type separation pairs of the input reference block are recognized as one input block type in a fingerprint region of a thumb tip when a finger is put on the input reference block, so that the input selecting positions of a separation pair disposed outside the input reference block is recognized as the position of each A-B type separation pair of the left or right of the input reference block used on the input reference block, and thus, a data input is individually or continuously performed.

The input module according to the invention is characterized in that the input module includes a separation sensing unit for sensing a signal at the time of input.

The input in the input module according to the invention is characterized in that the input is performed by means of a separation input or a pair input.

The separation input according to the invention is characterize in that the separation input is performed in such a way that any one separated indication position among the separation pairs is selected, and then the data assigned to the corresponding separated indication position is inputted.

The pair input according to the invention is characterized in that the pair input is performed in such a way that an A separated indication position and a B separated indication position of A-B separated indication position of any one pair among the separation pairs are selected together, and then new data which is different from the data assigned to the corresponding separated indication positions is inputted.

The separation sensing unit according to the invention is characterized in that the separation sensing unit is provided so as to comprise any one of a pressure sensor or a tactile sensor, or to comprise a touch pad or a touch screen.

The input module according to the invention characterized in that the input module is provided so as to comprise an inputtable panel which is formed so that each separated indication position of the separation pairs is selected at the time of input, and is provided as a detachable type.

The input module in the input module according to the invention is characterized in that, when one or more A-B type separation pairs is further disposed outside the input reference block, an input selecting position of each separated indication position of the separation pair disposed outside the input reference block is recognized as each A-B type selecting position of the left or right of the input reference block based on the input reference block on which a finger is positioned, and each of the A-B type selecting positions is recognized as a forward-backward type of the A separated segment direction and the B separated segment direction based on the separation reference line.

The input module according to the invention is characterized in that the input module is provided so that a continuous signals of two or more times is generated according to a strength difference between applied pressures at the time of input selection.

The pair input according to the invention is characterized in that, in the pair input, when A separated indication position and B separated indication positions of an A-B separated indication position of any one pair among the separation pairs fail to make simultaneous contact with a sensing sensor, the control unit judges and determines two sequential signals as a pair input based on a preset time value and then processes the input.

The input in the input module according to the invention is characterized in that the input in the input module further comprises a separation pair combining input in which a separation input and a pair input are combined, and the separation pair combining input is performed in such a way that the separation input individually selecting any one separated indication position among the separation pairs and the pair input selecting together an A separated indication position and a B separated indication position of A-B separated indication position of any one pair among the separation pairs are sequentially combined with each other, so that new data different from the data assigned to the corresponding separated indication position is processed of input.

The separation pair combining input in the input module according to the invention is characterized in that, when the order of input operation of the separation input and the pair input are different from each other, the control unit judges and determines an input signal from a signal sensed at the time of each input, and then processes the input of different data assigned to each of the corresponding inputs.

The separation pair combining input of the input module according to the invention is characterized in that, in the separation pair combining input, when any one separated indication position at one separation pair among the separation pairs is selected in an overlapping manner and three signals are generated, the control unit judges whether the separation pair combining input is performed by a pair input after a separation input or by a separation input after a pair input from the three signals, and distinguishes inputting order of the inputs, and then processes the input of data assigned to the corresponding input.

The input module according to the invention is characterized in that the input module further comprises one or more input selecting segments which is formed at the upper side of the input module so that the position corresponding to each separated indication position of the separation pairs is selected at the time of input.

The input selecting segment of the input module according to the invention are characterized in that one or more separating grooves or separating lines of a protrusion type is formed in the input selecting segment, and the input selecting segment is divided as the left-middle-right type of the input selecting segment by means of the separating grooves or the separating lines based on the middle of the input reference block provided in the input module.

The separating groove or the separating line of the input module according to the invention is characterized in that the separating grooves or the separating lines are wholly or partially formed in any one or more shapes of a straight line, a curve, or a wavy pattern, and is wholly or partially provided in a symmetric or asymmetric type.

The input selecting segment of the input module according to the invention is characterized in that the input selecting segment is provided to the input module as a separated protuberance or a protruding frame types.

The input module according to the invention is characterized in that the input module is comprised in a holding type interface which is provided to a holder contacted with and separated from the base, a detachable type interface which is provided in a form coupled with and decoupled from the base, a wired type interface which is connected with the wire to the base, or a wireless type interface which is wirelessly connected to the base providing a display unit.

Each of the interfaces according to the invention is characterized in that one or more side keys or function keys is further comprised at the predetermined position of the interface of each.

The input in the input module according to the invention is characterized in that the input the input module further comprises a pair alternating input, and the pair alternating input is performed in such a way that an A separated indication position and a B separated indication position of an A-B separated indication position of any one pair among the separation pairs are continuously selected in a sequential manner, or, conversely, the B separated indication position and the A separated indication position are continuously selected in a sequential manner, so that a data input is performed.

The pair alternating input in the input module according to the invention is characterized in that, in the pair alternating input, two input signals which are generated by means of the order of the alternating input operation of the A separated indication position and the B separated indication position of one pair among separation pairs are processed of input as the data that are respectively different from each other.

The input module according to the invention characterized in that a touch sensing unit for sensing contact of a finger contact is further provided on the upper side of the input module selecting each of the separated indication positions, and touch sensing unit generates an input signal in response to a contact of a finder contact with each of the separated indication positions.

A data input device according to another aspect of the invention includes an input module which is provided to a base, wherein the input module includes four A-B type separation pairs which are disposed by each one pair along a separation reference line as an array of A-B separated indication positions in which four A separated indication positions in an A separated segment and four B separated indication positions in a B separated segment are separated from and corresponded each other as a face-to-face type based on the separation reference line, in the two sides, that is, the A separated segment and the B separated segment which are ambilaterally divided from the separation reference line based on a separation reference point which is a reference position within a contact area of a finger as well as the one separation reference line passing through the separation reference point, and the input module includes an input reference block in which three A-B type separation pairs are continuously and adjacently arranged as a left-middle-right type around the separation reference point, so that an input by means of an individual or continuous selection to one or more separated indication positions among the separation pairs is sensed and an input signal corresponding to the input by means of an individual or continuous selection is generated; and a control unit which judges and distinguishes between the input by means of an individual selection and the input by means of a continuous selection from the input signal, and then extracts the data assigned to the distinguished input signal from a memory unit and processes the input, characterized in that the three A-B type separation pairs of the input reference block are positioned within the rolling movement range of a fingerprint region of a thumb tip and the position of each separation pair of the input reference block is recognized as the position of a left-middle-right type around the middle of a fingertip, while at the same time the three A-B type separation pairs of the input reference block are recognized as one input block type in a fingerprint region of the thumb tip when a finger is put on the input reference block, so that the input selecting positions of a separation pair disposed outside the input reference block is recognized as the position of each A-B type separation pair of the left or right of the input reference block based on the input reference block, and thus, a data input is individually or continuously performed.

A data input device according to further aspect of the invention includes an input unit which is provided to a base, wherein the input unit includes a number of A-B type separation pairs which are disposed by each one pair along a separation reference line, as an array of A-B separated indication positions in which a number of A separated indication positions in an A separated segment and a number of B separated indication positions in a B separated segment are separated from and corresponded each other as a face-to-face type based on the separation reference line, in the two sides, that is the A separated segment and the B separated segment which are ambilaterally divided from the separation reference line based on a separation reference point which is a reference position within a contact area of a finger as well as the one separation reference line passing through the separation reference point, and the input module includes an input reference block in which three A-B type separation pairs are continuously and adjacently arranged as a left-middle-right type around the separation reference point; a separation sensing unit which senses an input by means of an individual or continuous selection to one or more separated indication positions among the separation pairs and generates an input signal corresponding to the input by means of an individual or continuous selection; and a control unit which judges and distinguishes between the input by means of an individual selection and the input by means of a continuous selection from the input signal, and then extracts the data assigned to the distinguished input signal from a memory unit and processes the input, characterized in that the three A-B type separation pairs of the input reference block are positioned within the rolling movement range of a fingerprint region of a thumb tip and the position of each separation pair of the input reference block is recognized as the position of a left-middle-right type around the middle of a fingertip, while at the same time the three A-B type separation pairs of the input reference block are recognized as one input block type in a fingerprint region of a thumb tip when a finger is put on the input reference block, so that the input selecting positions of a separation pair disposed outside the put reference block is recognized as the position of each A-B type separation pair of the left or right of the input reference black based on the input reference block, and thus, a data input is individually or continuously performed.

The input module according to the invention is characterized in that two or more input modules are provided at the predetermined position in the base.

The input module according to the invention is characterized in that the two input modules a provide at the predetermined position in the base, and, in the two input modules, any one or more inputs among the input by means of a separation input, a pair input, or a separation pair combining input is composed so as to perform identically with each other or to perform differently from each other.

The input module according to the invention is characterized in that, in the input module, different functions are respectively assigned to any one or more among the separation input, the pair input, or the separation pair combining input, so that a data input is performed.

The input module according to the invention is characterized in that the input module is formed in any one among a flat panel shape, a polygon, an oval, a hemisphere shape, a whole circle, or a partial circle, or in a combining type of the one or more shapes among the above-mentioned shapes.

The input module according to the invention is characterized in that the input module further comprises any one among a separating groove, a separating line, a separated protuberance, or a protruding frame to each of the shapes.

A data input device according to a still further aspect of the invention includes two input modules which are provided to a base, wherein each of the input modules includes a number of A-B type separation pairs which are disposed by each one pair along a separation reference line as an array of A-B separated indication positions in which a number of A separated indication positions in an A separated segment and a number of B separated indication positions in a B separated segment are separated from and corresponded each other as a face-to-face type based on the separation reference line, in the two sides, that is, the A separated segment and the B separated segment which are ambilaterally divided from the separation reference line based on a separation reference point which is a reference position within a contact area of a finger as well as the one separation reference line passing through the separation reference point, and each of the input modules includes an input reference block in which three A-B type separation pairs are continuously and adjacently arranged as a left-middle-right type around the separation reference point, so that an input by means of an individual or continuous selection to one or more separated indication positions among the separation pairs is sensed and an input signal corresponding to the input by means of an individual or continuous selection is generated; and a control unit which judges and distinguishes between the input by means of an individual selection and the input by means of a continuous selection from the input signal, and then extracts the data assigned to the distinguished input signal from a memory unit and processes the input, characterized in that the three A-B type separation pairs of the input reference block are positioned within the rolling movement range of a fingerprint region of a thumb tip and the position of each separation pair of the input reference block is recognized as the position of a left-middle-right type around the middle of a fingertip, while at the same time the three A-B type separation pairs of the input reference block are recognized as one input block type in a fingerprint region of the thumb tip when a finger put on the input reference block, so that the input selecting positions of a separation pair disposed outside the input reference block is recognized as the position of each A-B type separation pair of the left or right of the input reference block based on the input reference block, and thus, a data input is individually or continuously performed.

Advantageous Effects

A data input device having the above-mentioned configuration according to the invention has an advantage in which an input reference block of the input module positioned within the rolling movement range of a fingerprint region of a fingertip and the position of each separation pair of the input reference block is recognized as the position of a left-middle-right type around the middle of a fingertip, while at the same time the input reference block is recognized as one input block type as soon as a finger is put on the input reference block and an input selecting positions disposed outside the input reference block is recognized as the position of each A-B type separation pair of the left or right of the input reference block based on the input reference block, so that a data input cart be individually or continuously performed in an easy and quick manner by means of a short moving line of a finger and a familiar input operation according to the position recognition at the time of input.

In addition, the invention has another advantage in which the input module can become more miniaturized or compact in a size corresponding to the width of the rolling movement range of a fingerprint region of a thumb tip or in a size corresponding to the width of a thumb tip, and thus, be applied to various kinds of electronic devices or portable terminals as various forms so as to perform a data input.

BEST MODE

Figure 1:
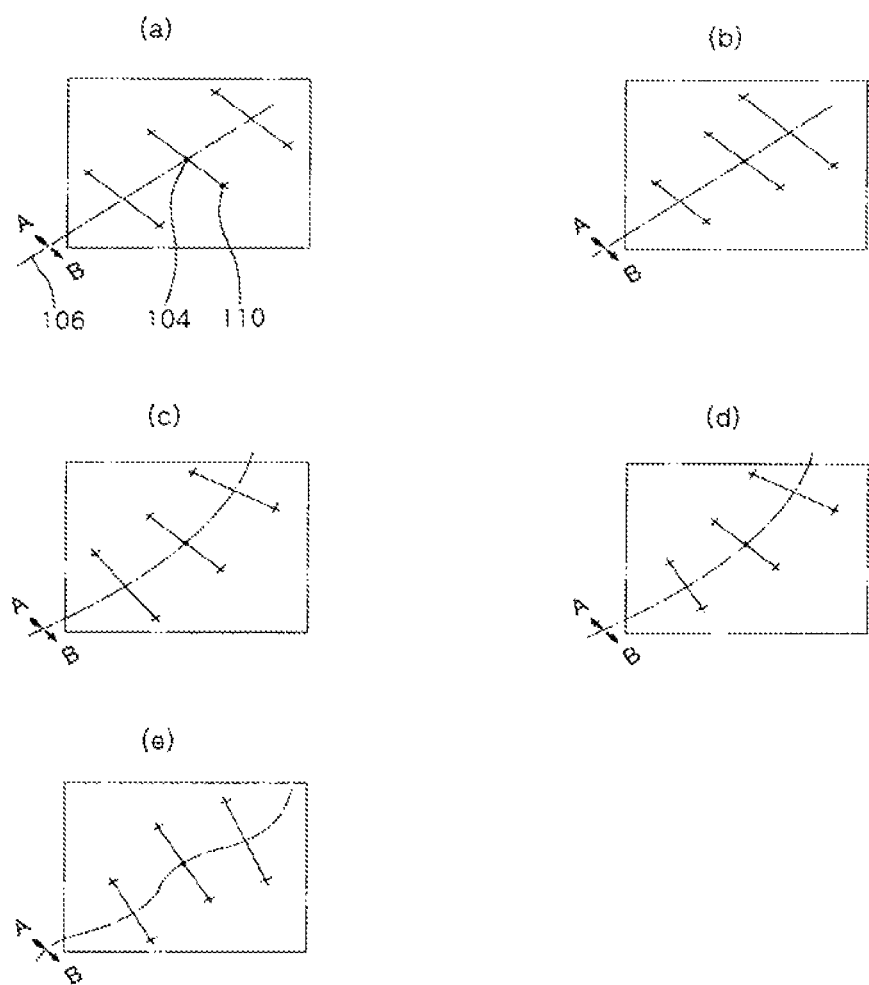
FIG. 1 is an exemplary view illustrating a separation reference line or a separated indication positions according to the invention provided in a variety of types.

As the best mode of carrying out the invention, the invention provides a data input device using A-B type separation pairs including an input module 100 which is provided to a base 10, wherein the input module 100 includes a number of A-B type separation pairs 150 which are disposed by each one pair along a separation reference line 106 as an array of A-B separated indication positions in which a number of A separated indication positions 132 in an A separated segment 130 and a number of B separated indication positions 142 in a B separated segment 140 are separated from and corresponded each other as a face-to-face type based on the separation reference line 106, in the two sides, that is, the A separated segment 130 and the B separated segment 140 which are ambilaterally divided from the separation reference line 106 based on a separation reference point 104 which is a reference position within a contact area of a finger as well as the one separation reference line 106 passing through the separation reference point 104, and the input module 100 includes an input reference block 121 in which three A-B type separation pairs 150 are continuously and adjacently arranged as a left-middle-right type around the separation reference point 104, so that an input by means of an individual or continuous selection to one or more separated indication positions 110 among the separation pairs 150 is sensed and an input signal corresponding to the input by means of an individual or continuous selection is generated; and a control unit 400 which judges and distinguishes between the input by means of an individual selection and the input by means of a continuous selection from the input signal, and then extracts the data assigned to the distinguished input signal from a memory unit 500 and processes the input, characterized in that the three A-B type separation pairs 150 of the input reference block 124 are positioned within the rolling movement range of a fingerprint region 910 of a thumb tip and the position of each separation pair 150 of the input reference block 124 is recognized as the position of a left-middle-right type around the central region of fingertip, while at the same time the three A-B type separation pairs 150 of the input reference block 124 are recognized as one input block type in a fingerprint region 910 of thumb tip when a finger is put on the input reference block 124, so that the input selecting positions of a separation pair 150 disposed outside the input reference block 124 is recognized as the position of each A-B type separation pair 150 of the left or right of the input reference block 124 based on the input reference block 124, and thus, a data input is individually or continuously performed.

Mode for Invention

Hereinafter, the invention will be described in detail with reference to the accompanying drawings.

Figure 3:
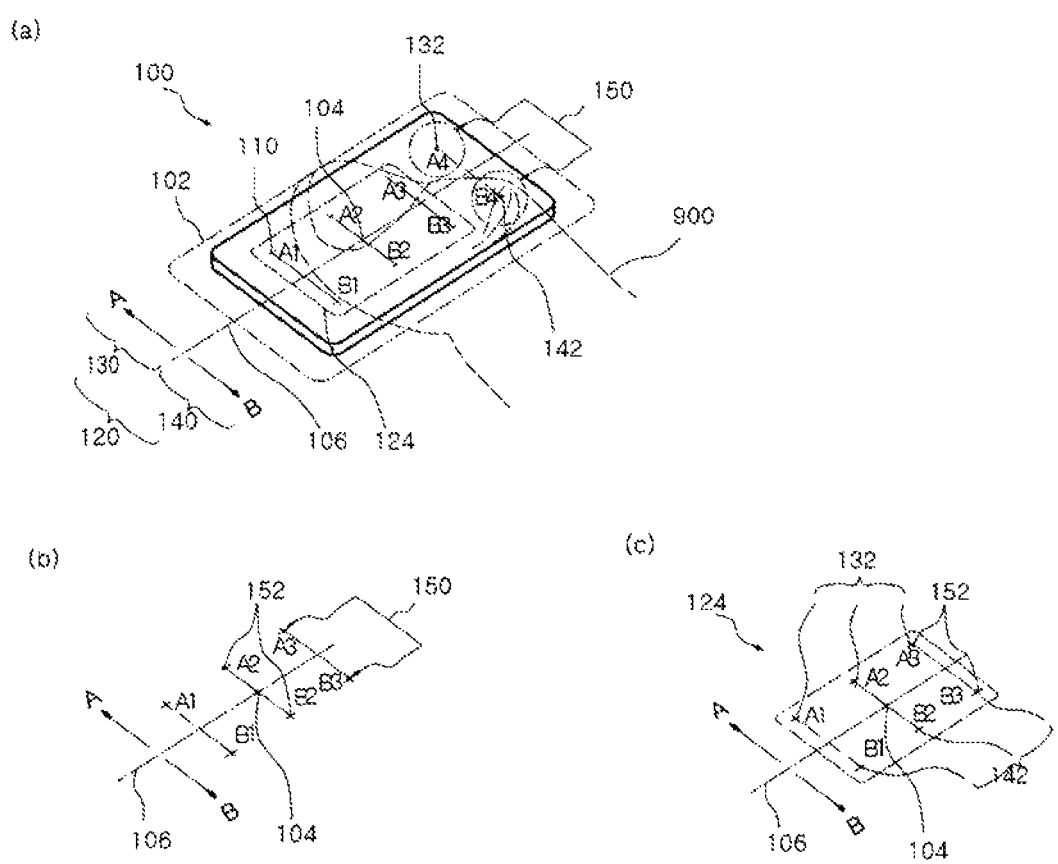
FIG. 3 is a conceptual diagram of an input module providing a number of A-B type separation pairs, in the data input device according to the invention.

Referring to FIG. 3, a data input device 1 using A-B type separation pairs 150 according to the invention includes an input module 100 provided in a predetermined position of a base 10, wherein the input module 100 provides a number of A-B type separation pairs 150 which are disposed by each one pair along a separation reference line 106 as an array of A-B separated indication positions in which a number of A separated indication positions 132 in an A separated segment 130 and a number of B separated indication positions 142 in a B separated segment 140 are separated from and corresponded each other as a face-to-face type based on the separation reference line 106, in the two sides, that is, the A separated segment 130 and the B separated segment 140 which are ambilaterally divided from the separation reference line 106 based on a separation reference point 104 which is a reference position within a contact area of a finger as well as the one separation reference line 106 passing through the separation reference point 104, and an input by means of an individual or continuous selection to one or more separated indication positions 110 among the separation pairs 150 is sensed and an input signal corresponding to the input by means of an individual or continuous selection is generated; and a control unit which judges and distinguishes between the input by means of an individual selection and the input by means of a continuous selection from the input signal, and then extracts the data assigned to the distinguished input signal from a memory unit and processes the input.

Specifically, as shown in FIGS. 3a to 3c, the input module 100 or the separation pairs 150 may be configured so as to provide three A-B type separation pairs which are disposed by each one pair along the separation reference line 106 as an array of A-B separated indication positions 152 in which three A separated indication positions 132 in the A separated segment 130 and three B separated indication positions 142 in the B separated segment 140 are separated from and corresponded each other as a face-to-face type based on the separation reference line 106 passing through the separation reference point 104, and to include an input reference block 124 in which the three A-B type separation pairs are continuously and adjacently arranged as the left-middle-right type around the separation reference point 104.

Figure 13:
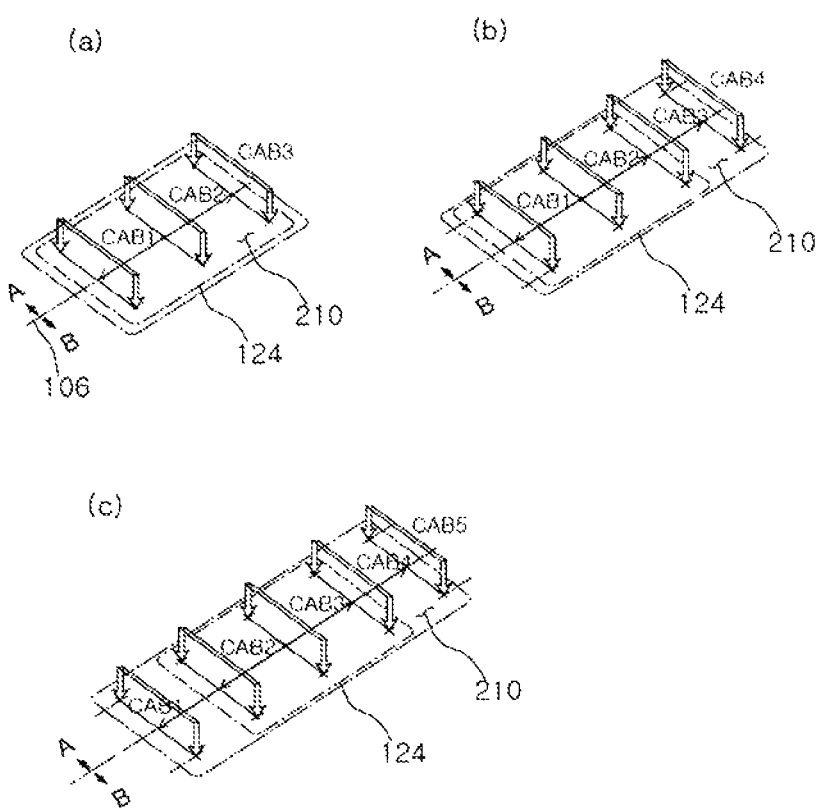
FIG. 13 is an exemplary view for explaining the pair input in various embodiments implemented based on the middle of the input reference block according to the invention.

Here, as shown in FIGS. 3 to 7, FIG. 9, and FIG. 12, the three A-B type separation pairs of the input reference block 124 are positioned within the rolling movement range of a fingerprint region 910 of a thumb tip, and the position of each separation pair 150 of the input reference block 124 is recognized as the position of a left-middle-right type around the middle of a fingertip, while at the same time the three A-B type separation pairs of the input reference block 124 are recognized as one input block type within a fingerprint region 910 of the thumb tip as soon as a finger is put on the input reference block 124, so that input selecting positions of a separation pair 150 disposed outside the input reference block 124 are recognized as the position of each A-B type separation pair 150 of the left or right of the input reference block based on the input reference block 124. In this case, as shown in FIG. 12c or 13c, the input reference block 124 may be provided in the central region of the input module 100 or the separation pairs 150.

As described above, input selecting positions of the input module 100 are recognized as each of the each A-B type separation pairs 150 which is disposed as an array of A-B separated indication positions, based on the input reference block 124 recognized as one input block type within a fingerprint region 910 of the thumb tip, so that there is an advantage in which users can individually or continuously perform a data input in an easy and quick manner.

In addition, a separation sensing unit 300 for sensing a signal generated when an input is made in the input module 100 may comprise any one among a pressure sensor, a touch pad, a touch screen, or a tactile sensor. Furthermore, the separation sensing unit is provided as a touch pad or a touch screen having a tactile sensor, thereby sensing various types of pressures applied to each of the separated indication positions 110 when the input is selected. Here, the input represents that a data input is performed by means of any one of a separation input or a pair input.

Referring to FIGS. 3 and 11a, a separation input is performed in such a way that any one separated indication position 110 among the separation pairs 150 is selected within a contact area of a finger 102 of the input module 100, so that a data assigned to the corresponding separated indication position A1, B1, A2, B2, etc. is inputted. Referring to FIGS. 3 and 11b, a pair input, is performed in such a way that the A separated indication position 132 and the separated indication position 142 of A-B separated indication position 152 of any one pair among the separation pairs 150 are selected together within a contact area of a finger 102 of the input module 100, so that new data different from the data assigned to the corresponding separated indication positions A1, B1, A2, B2, etc. is inputted.

FIG. 3 is a conceptual diagram of the input module 100 providing a number of A-B type separation pairs 150. Here, "A-B" randomly expresses the type of a pair according to positions separated from and corresponded each other as a face-to-face type, or the shape of a pair in which one A separated indication position 132 in the A separated segment 130 and one B separated indication position 142 in the B separated segment 140 are separated from and corresponded each other as a face-to-face type based on the separation reference line 106, in the two sides, that is, the A separated segment 130 and the separated segment 140 of a separated segment 120 which are ambilaterally divided from the separation reference line based on the separation reference point 104 which is a reference position in the input module 100 and the one separation reference line 106 passing through the separation reference point, using A and B. In addition, "A-B type" represents an A-B shape in which the one A separated indication, position 132' and the one B separated indication position 142 are separated from and corresponded each other as a face-to-face type based on the one separation reference line 106 passing through the separation reference point 104. In other words, the "A-B" or "A-B type" expresses the shape of a separation pair 150 which is disposed as an array of A-B separated indication position 152 in which two different separated indication positions, that is, the A separated indication position and the B separated indication position, are separated from and corresponded each other as a face-to-face type from the separation reference line based on the one separation reference line 106 passing through the separation reference point 104.

Referring to FIG. 3a, the separation reference point 104, that is, a reference position according to the invention, may be also another reference position for an input selection within a contact area of a finger 102 of the input module 100 at the time of input. As shown in FIG. 3, the separation reference point 104 may be positioned in the middle of the input reference block 124.

In addition, the separation reference line 106 is a reference line which is used to divide a separated segment 120 into the A separated segment 130 and the B separated segment 140, or to dispose the A separated indication positions 132 of the A separated segment 130 and the B separated indication positions 142 of the B separated segment 110 as an array of A-B separated indication position 152 of an A-B type in which the A and B separated indication positions are separated from and corresponded each other as a face-to-face type, within a contact area of a finger 102 of the input module 100.

Furthermore, the separated segment 120 in which an input selection is implemented represents two input selection regions which are divided into two sides, that is, the A separated segment 130 and the B separated segment 110 from the separation reference line based on the separation reference line 106 passing through the separation reference point 104 within a contact area of a finger 102 of the input module 100. Here, in the separated segment 120, a direction in which the separated indication position 110 is separated from the separation reference line 106 to the A separated segment is defined as a direction of A separated segment (a shown arrow A), while a direction in which the separated indication position is separated from the separation reference line 106 to the B separated segment is defined as a direction of B separated segment (a shown arrow B), wherein the direction of A separated segment and B separated segment may respectively form a forward one and a backward one based on the separation reference line 106.

Besides, the separation pair 150 represents an A-B separated indication position 152 of an A-B type which is disposed as an array of A-B separated indication position in which the one A separated indication position 132 in the A separated segment and the one B separated indication position 142 in the B separated segment are separated from and corresponded each other as a face-to-face type based on the separation reference line 106, in the two sides, that is, the A and B separated segments which are ambilaterally divided from the separation reference line based on the separation reference line 106 passing through the separation reference point 104, within a contact area of a finger 102 of the input module 100. That is, one separation pair 150 represents one A-B separated indication position 152.

And, at the separated indication position 110 of the input module 100, an input signal assigned to the corresponding separated indication position is generated by means of an input, selection including a pressure or a contact applied when an input is made. That is, the separated indication position 110 according to the invention is one of means for generating an input signal corresponding to the input selection in the input module 100.

As shown in FIG. 3a or 3c, the input module 100 may include the input reference block 124 which is a reference used to recognize the position of an input selection when an input is made. The input reference block 124 represents an input selection region in which the three A-B type separation pairs 150 are continuously and adjacently disposed by each one pair along the separation reference line 106 passing through the separation reference point based on the separation reference point 104.

Referring to FIGS. 9a to 9g, the input reference block 124 may be provided in a size corresponding to the width of a path of the rolling movement of a fingerprint region 910 of a thumb tip. Accordingly, as shown in FIG. 9e, each of the input selecting positions corresponding to the three A separated indication positions 132 of the A separated segment and the three B separated indication positions 142 of the B separated segment may be easily selected by means of a short moving line of the rolling movement of a fingertip based on the middle of the input reference block 124, in a state in which a finger makes contact with the block.

Figure 9:
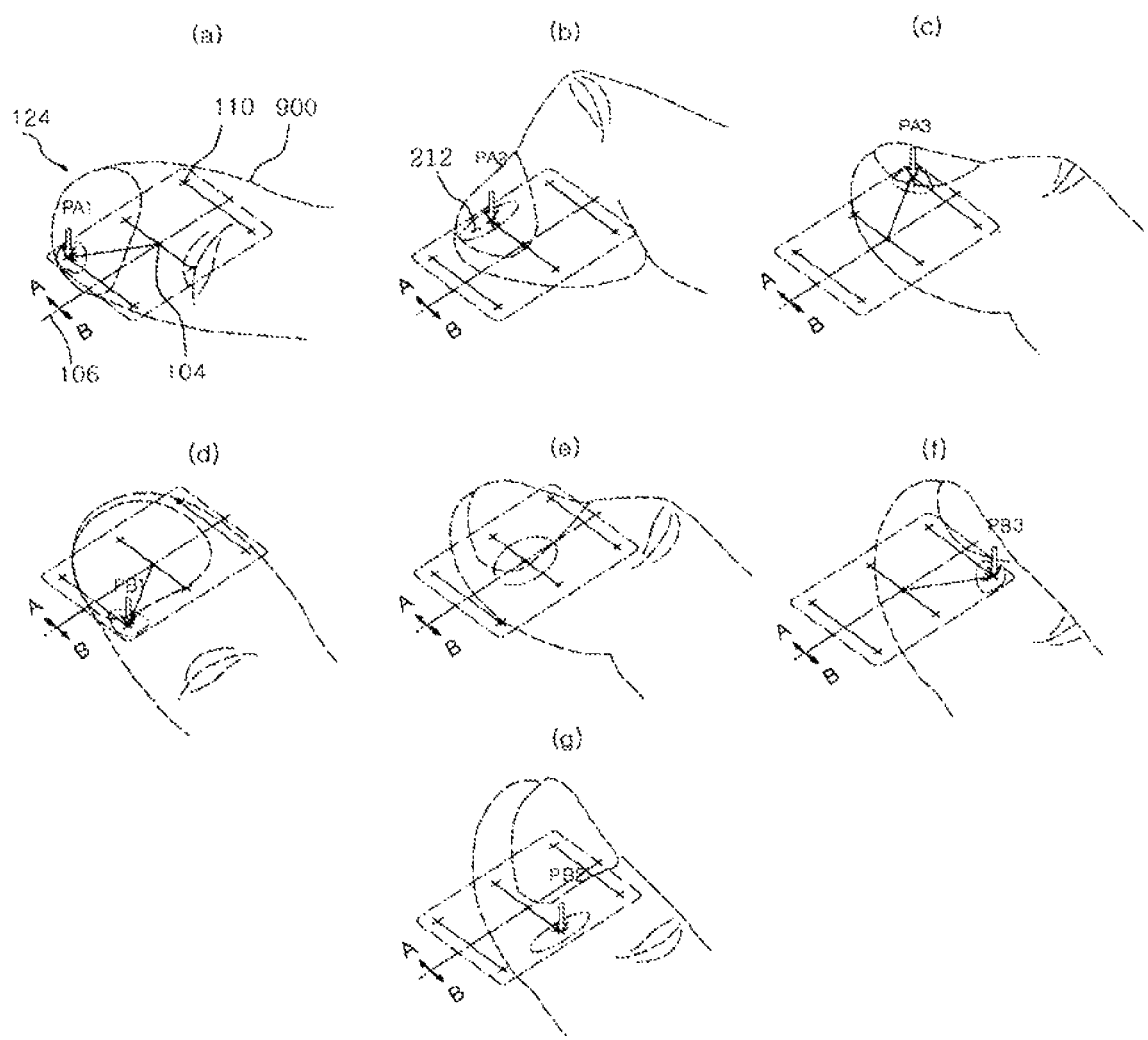
FIG. 9 is an exemplary view for explaining the separation input which presses each of the input selecting positions by means of a rolling movement of a finger around the middle of an input reference block according to en embodiment of the invention.

Therefore, as shown in FIG. 9, the total input selecting positions corresponding to each A-B separated indication position 152 of three separation pairs may be easily and continuously selected by means of a short moving line of the rolling movement of a thumb as though being selected by means of an one-time input operation, in the input reference block 124.

Specifically, each of the input selecting positions of the separated indication positions 110 is recognized as an A-B type based on the middle of the input reference block 124 including the separation reference point 104 and the separation reference line 106 as soon as a fingertip is put on the input reference block 124.

That is, the input selecting position of each of the separated indication positions 110 of the input reference block 124 is recognized as an A-B type selecting positions of a left-middle-right type based on the middle of the input reference block 124 in which the separation reference point 104 is positioned. Here, each of the A-B type selecting positions of the left-middle-right type is recognized as a forward-backward type based on a separation reference line 106. Accordingly, each input may be individually or continuously performed in an easy and quick manner, in a state in which the total input selecting positions corresponding to each of the separated indication positions 110 of the three A-B type separation pairs 150 is recognized based on the middle of the input reference block in which the separation reference point 104 is positioned.

In addition, the input reference block 124 is provided within an area in which an input selection can be performed by means of a short moving line of the rolling movement of a finger, so that the finger is naturally return to the central region of the input reference block 124 as soon as applied pressure or contact of the finger is released after the input selection is made, and then a next input selecting operation can be continuously and quickly performed based on the middle of the input reference block 124. Here, as shown in FIG. 9e or 10a, the central region of the input reference block 124 to which a finger naturally returns may be a contact region in a state in which the fingertip is positioned in the middle of the input reference block 124, or in the ready state of the input selection or in the waiting state of the input on which a finger positioned.

FIGS. 5a and 5h are exemplary views illustrating a separation input in which a data input is performed by means of a selection of a separated indication position 110 recognized as an input selecting position of an input reference block 124.

For example, FIG. 5a illustrates a case in which A1 separated indication position is selected around the middle of the input reference block 124 (①→②), and the A1 separated indication position is selected when pressure is applied to the forward left position recognized based on the middle of the input reference block 124, so that the input can be easily and quickly performed.

Likewise, FIG. 5b illustrates a case in which B3 separated indication position and B1 separated indication position are sequentially selected based on the middle of the input reference block 124 (③→④), and the B3 separated indication position is selected when pressure is applied to the backward right position recognized based on the middle of the input reference block 124, and than a finger naturally return to the central region of the input reference block 124 as soon as the selection is released by means of the rolling movement of the finger from the B3 separated indication position, and after that, the B1 separated indication position is selected when the backward left position is pressed, so that the input can be quickly and easily performed by each of the input selections in a state in which the positions become familiar by means of the position recognition.

Figure 8:
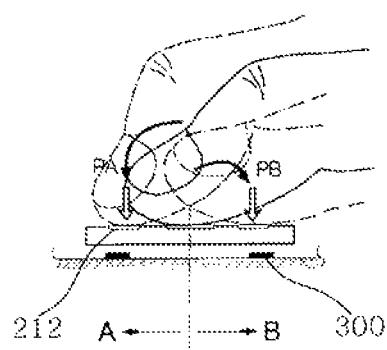
FIG. 8 is an exemplary view illustrating a type of an input operation of a rolling movement of a finger moving to each of the input selecting positions when a separation input is made, in the input reference block according to an embodiment of the invention.

In addition, referring to FIG. 8, in case that an A separated indication position and a B separated indication position are sequentially selected based on the middle of the input reference block 124, a forward A separated indication position recognized based on the middle of the input reference block 124 is selected (PA), and then a finger naturally return to the central region of the input reference block 124 as soon as pressure or contact of the finger is released, so that an input operation which sequentially selects the forward A separated indication position and the backward B separated indication position (PA→PB) is quickly and easily performed by means of a short moving line of the rolling movement of the finger as though being selected by means of an one-time input operation.

Figure 7:
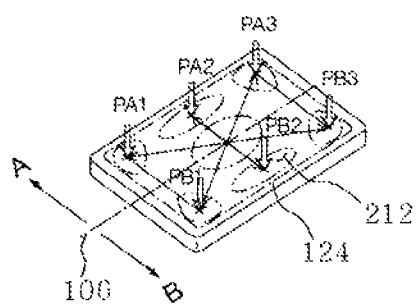
FIG. 7 is an exemplary view illustrating an input contact region of a finger in each input selecting position of the input reference block according to an embodiment of the invention.

Referring to FIG. 7, an input surface corresponding to each of the separated indication positions 110 of the input reference block 124 may further include an input contact region 212 which is formed so that the corresponding separated indication position is selected.

Besides, the input module 100 may include an inputtable panel which is formed so that each of the separated indication positions 110 in a number of the A-B type separation pairs 150 is selected at the time of input, and is provided as a detachable type. In addition, the input module 100 may be provided in various forms made of an elastic or inelastic material.

Hereinafter, a configuration and embodiments of the data input device 1 according to the invention will be described in detail with reference to the accompanying drawings.

First Embodiment

A data input device 1 using A-B type separation pairs 150 according to a first embodiment of the invention includes an input module 100 in which a separation input is performed within a contact area of a finger 102 formed at a predetermined position of a base 10 of electronic device and an input signal corresponding to the separation input is generated, and a control unit 400 which judges the input signal sensed at the separation input and processes an input command assigned to the corresponding input.

Here, as shown in FIGS. 10b and 11a, the separation input according to the invention is performed in such a way that the input module 100 provides a number of the A-B type separation pairs 150 which are disposed by each one pair along a separation reference line 106 as an array of A-B separated indication positions 152 in which a number of A separated indication positions 132 in an A separated segment and a number of B separated indication positions 142 in a B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through a separation reference point 104 within a contact area of a finger 102 of the input module 100, and any one separated indication position 110 among the separation pairs 150 is selected and then a data assigned to the corresponding separated indication position A1, B1, A2, B2, etc. is inputted.

For example, the separation input is performed in such a way that a finger positioned in the middle of an input reference block 124 as shown in FIG. 10a moves to an input selecting position corresponding to the A separated indication position 132 as shown in FIG. 10b and then presses the A separated indication position 132 (PA), so that the data assigned to the A separated indication position 132 can be inputted. In this example, the input may be performed in a type of an input, operation that presses or touches each input selecting position of the separation pairs 150, and various types of input selecting operations may be further included.

As shown in FIG. 12a, the separation input according to the invention is performed in such a way that the input module provides the three type separation pairs 150 which are disposed by each one pair along the separation reference line 106 in an array of A-B separated indication positions 152 in which the three A separated indication positions A1, A2, and A3 in the A separated segment and the three B separated indication positions B1, B2, and B3 in B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through the separation reference point 104 within a contact area of a finger 102 of the input module 100, and any one separated indication position 110 among the separation pairs 150 is selected and then the data assigned to the corresponding separated indication position A1, B1, A2, B2, etc. is inputted. Here, the separation pairs are provided as an input reference block 124 in which the three A-B type separation pairs are continuously and adjacently arranged as a left-middle-right type around the separation reference point 104.

FIG. 9 is an exemplary view illustrating displacement and types of an input operation of a thumb according to the rolling movement of a fingerprint region 910 of the thumb based on the middle of the input reference block 124, when users select each of the separated indication positions 110 of the three A-B type separation pairs 150 which are disposed by each one pair along the separation reference line as an array of A-B separated indication position based on the separation reference line 106 passing through the separation reference point 104 of the input reference block 124.

FIG. 9e illustrates a state in which a finger is positioned in the middle of the input reference block 124 when the finger is put on the input reference block 124 or the finger naturally moves to the central region of the input reference block 124.

For example, FIG. 9b illustrates a case in which the A2 separated indication position is selected based on the middle of the input reference block 124, and an input is performed in such a way that when pressure is applied to the forward middle position recognized around the middle of the input reference block 124 by means of the rolling movement of a finger (PA2), the A2 separated indication position in FIG. 9*b* is selected. Alternatively, an input contact region 212 which is formed in the input selecting position corresponding to the A2 separated indication position is pressed (PA2), so that the input may be performed.

In other words, referring to FIGS. 9*b* and 9*g*, in case that the A2 separated indication position and the B2 separated indication position recognized based on the middle of the input reference block 124 are selected, an input signal corresponding to the A2 separated indication position in FIG. 9*b* is generated when the forward position is pressed based on the input reference block 124, while another input signal corresponding to the B2 separated indication position in FIG. 9*g* is generated when the backward position is pressed based on the input reference block 124. Alternatively, the input contact region 212 which is formed in the input selecting position corresponding to each of the separated indication positions A2 and B2 is pressed (PA2 or PB2), so that the input may be performed.

Likewise, in case that, referring to FIGS. 9*a* and 9*d*, the A1 separated indication position and the B1 separated indication position recognized based on the middle of the input reference block 124 are selected, or referring to FIGS. 9*c* and 9*f*, the A3 separated indication position and the B3 separated indication position recognized based on the middle of the input reference block 124 are respectively selected, an input signal corresponding to the A1 separated indication position in FIG. 9*a* is generated when the forward left position is pressed, an input signal corresponding to the B1 separated indication position in FIG. 9*d* is generated when the backward left position is pressed, an input signal corresponding to the A3 separated indication position in FIG. 9*c* is generated when the forward right position is pressed, and an input signal corresponding to the B3 separated indication position in FIG. 9*f* is generated when the backward right position is pressed, based on the middle of the input reference block 124. Alternatively, the input contact region 212 which is formed in the input selecting position corresponding to each of the separated indication positions A1, B1, A3, and B3 is pressed (PA1, PB1, PA3 or PB3), so that the input may be performed.

In these cases, the total input selecting positions corresponding to the separated indication positions 110 are recognized as an array of a left-middle-right type of A-B type selecting positions based on the input reference block 124 as soon as a fingertip is put on the input reference block 124, and each of the type selecting positions of the left middle-right type is familiarly recognized as a forward-backward type based on the separation reference line 106, so that the separation input in the input reference block 124 can be individually or continuously performed in an easy and quick manner.

Here, the rolling movement of a fingerprint region of the thumb tip is performed in such a way that a fingerprint region of the thumb is put on an input surface with which an input means makes contact and then rolls, and in the course of this, in the input reference block 124, the finger naturally returns to the central region of the input reference block 124 immediately after the input selection, so that a next input operation or a continuous input can be easy and quickly performed.

For example, referring to FIG. 5*b*, in case that the B3 separated indication position and the B1 separated indication position are sequentially selected based on the middle of the input reference block 124 (③→④), the B3 separated indication position is selected when the backward right position recognized based on the middle of the input reference block 124 is pressed, and then the finger naturally returns to the central region of the input reference block 124, and after that, the B1 separated indication position is selected when the backward left position recognized based on the middle of the input reference block 124 is pressed, so that the inputs can be quickly and easily performed.

Figure 4:
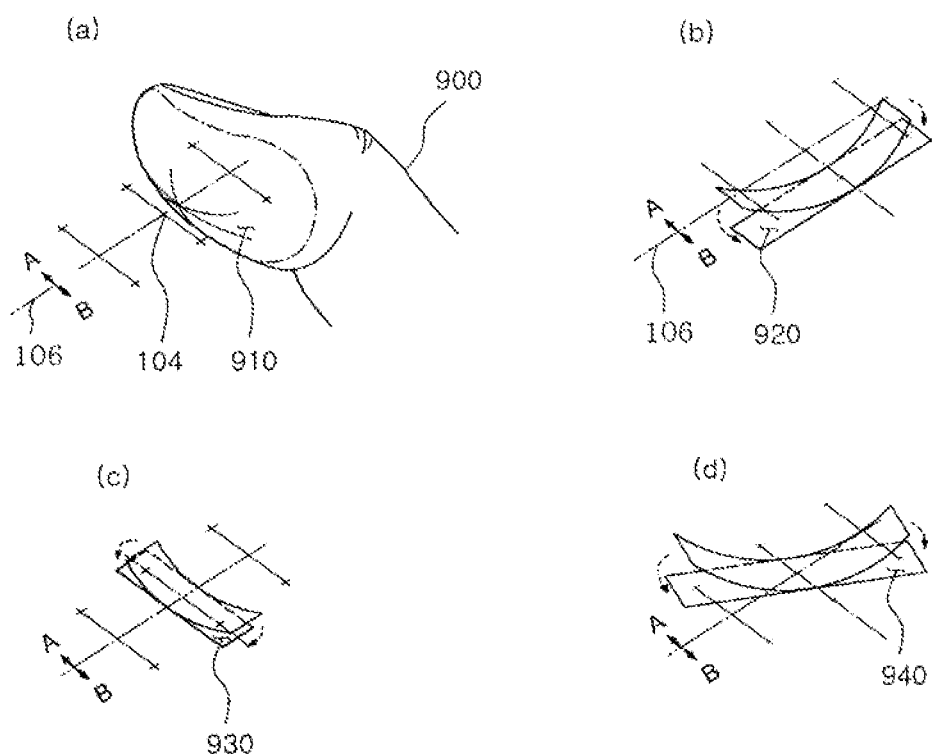
FIG. 4 is an exemplary view illustrating a path of the rolling movement of a fingerprint region of a fingertip as well as a contact region of the input operation within the rolling movement range of a finger according to an embodiment of the invention.
Figure 5:
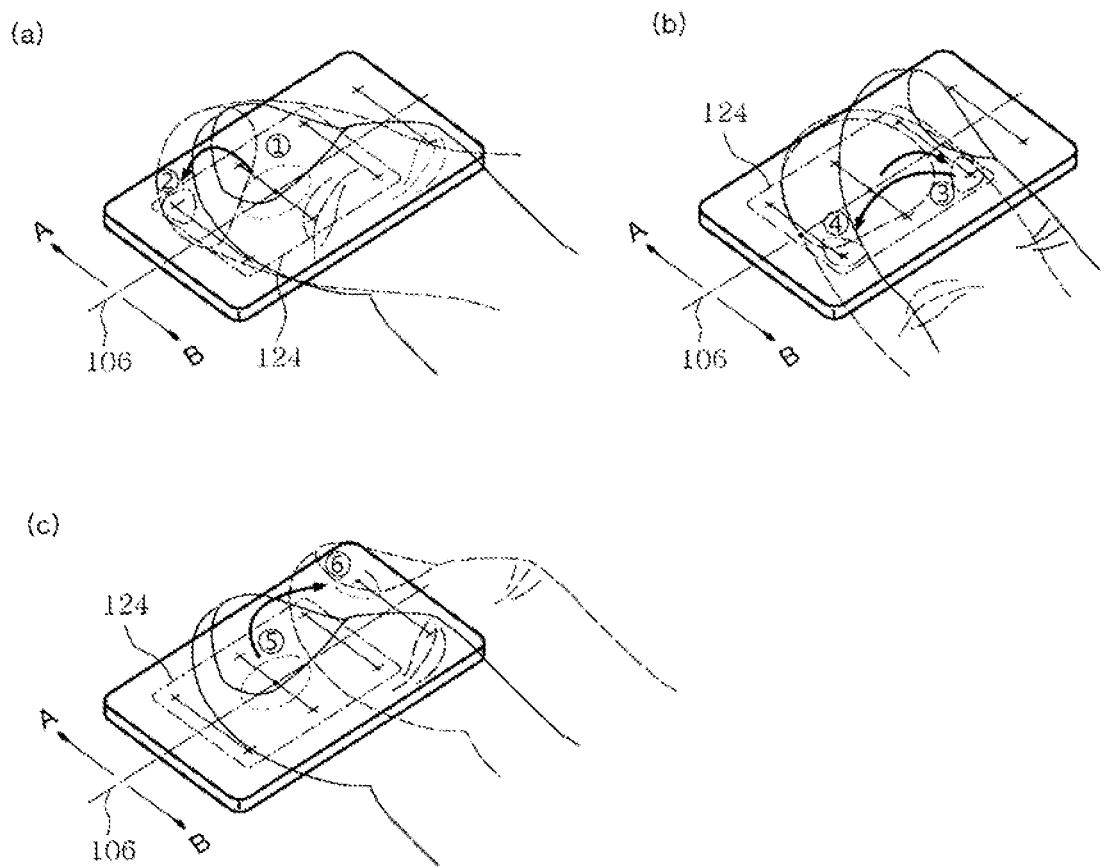
FIG. 5 is an exemplary view illustrating a case in which input selecting positions are recognized based on the middle of an input reference block when a finger is put on, and types of rolling movements and input operations of a finger based on the recognition, in the input module according to an embodiment of the invention.

For another example, FIG. 4 is an exemplary view illustrating a path of the rolling movement of a fingerprint region 910 of a fingertip and a contact region of the rolling movement of a fingerprint region 910 of a fingertip in each input operation according to the path, within the rolling movement range of a fingerprint region 910 of a finger.

FIG. 4*a* illustrates a fingertip which can make contact with the input reference block 124 of the input module 100 during the rolling movement of a finger, and it is preferred that a thumb among fingers is used for an input means 900.

Here, referring to FIG. 4, when a finger is put on the input reference block 124 in which the three A-B type separation pairs 150 are disposed based on the separation reference line 106 passing through the separation reference point 104, the whole input selecting positions corresponding to the separated indication positions 110 of the separation pairs 150 are recognized as an array of a left-middle-right type of an A-B type selecting positions. Accordingly, the input reference block 124 provides the input selecting positions as a left-middle-right type 920 of the A separated segment or the B separated segment around the middle of a fingertip as an example in FIG. 4*b*, as a forward-backward type 930 of the A separated segment and the B separated segment around the middle of a fingertip as another example in FIG. 4*c*, or as a diagonal direction type 940 of the A separated segment and the B separated segment around the middle of a fingertip as another further example in FIG. 4*d*, so that a data input can be individually or continuously performed in an easy and quick manner by means of a short moving line of a finger and an input operation according to the position recognition.

Although the input reference block 124 may be provided in a size that is less than the width of a thumb when being formed in mobile devices, the input module 100 according to the invention is not limited thereto.

As shown in FIG. 12*a* or 12*c*, in the input module 100 according to the invention, even when one or more A-B type separation pairs is further disposed outside the input reference block 124, each of the separated indication positions of the separation pair disposed outside the input reference block 124 is recognized as the position of each A-B type selecting position of the left or right of the input reference block based on the input reference block 124 on which a finger is positioned. Here, each of the A-B type selecting positions may be recognized as a forward-backward type of the A separated segment direction and the B separated segment direction based on the separation reference line 106. Accordingly, the separation input in the input module 100 can be quickly performed.

As shown in FIG. 12*b*, the input module 100 according to the invention may be applied to electronic devices or portable terminals in a form which provides the input reference block 124 in which the three A-B type separation pairs 150 are continuously and adjacently arranged as a left-middle-right type around the separation reference point 104, and further has one A-B type separation pair outside one side of the input reference block 124.

When the separated indication position 110 disposed outside the input reference block 124 in the input module 100 is inputted, the input reference block 124 may be a reference so that each of the input selecting positions is recognized to the corresponding selection position.

Here, as shown in FIG. 12*b*, the separation input according to the invention is performed in such a way that any one separated indication position 110 among four A-B type separation pairs, in which one A-B type separation pair 150 is further provided outside one side of the input reference block 124 based on the input reference block 124 in such a size that the rolling movement of a fingerprint region 910 of a thumb tip may be performed, is selected based on the separation reference point 104 which is a reference point and the separation reference line 106 passing through the separation reference point 104 within a contact area of a finger 102 of the input module 100, and then a data assigned to the corresponding separated indication position 110 is inputted.

FIG. 5c is an exemplary view illustrating an input in which a separated indication position 110 of a separation pair 150 disposed outside to the right of the input reference block 124 based on the input reference block 124 in the input module 100 is selected. As shown in FIG. 5c, in case that the A4 separated indication position among the four A-B type separation pairs provided in the input module 100 is selected (⑤→⑥), the A4 separated indication position is selected when the very forward right position recognized based on the right edge of the input reference block 124 on which a finger is positioned is pressed, so that the input can be quickly and easily performed even to each of the separated indication positions 110 disposed outside of the input reference block 124.

Alternatively, differently from FIG. 5c, there may be an exemplary input in which a separated indication position 110 of a separation pair 150 disposed outside to the left of the input reference block 124 based on the input reference block 124 in the input module 100 is selected. Referring to FIG. 12b or 12c, in case that the A1 separated indication position in the input module 100 providing the four A-B type separation pairs is selected as shown in FIG. 12c, the A1 separated indication position is selected when the very forward left position recognized based on the left edge of the input reference block 124 on which a finger is positioned is pressed, so that the input can be quickly and easily performed.

As shown in FIG. 12c, the input module 100 according to the invention may be applied to electronic devices or portable terminals in a form which provides the input reference block 124 in which the three A-B type separation pairs 150 are continuously and adjacently arranged as a left-middle-right type around the separation reference point 104 and further has two A-B type separation pairs outside both sides of the input reference block. When the separated indication position 110 disposed outside the input reference block 124 in the input module 100 is inputted, the input reference block 124 may be a reference so that each of the input selecting positions is recognized to the corresponding selection position. Here, as shown in FIG. 12c, the separation input according to the invention is performed in such a way that any one separated indication position 110 among five A-B type separation pairs, in which two A-B type separation pair 150 are further provided outside both sides of the input reference block 124 based on the input reference block 124 in such a size that the rolling movement of a fingerprint region 910 of a thumb tip may be performed, is selected based on the separation reference point 104 which is a reference point and the separation reference line 106 passing through the separation reference point 104 within a contact area of a finger 102 of the input module 100, and then a data assigned to the corresponding separated indication position 110 is inputted.

Referring to FIG. 12c, there may be an exemplary input in which the separated indication position 110 of the separation pairs 150 respectively disposed outside the left and right sides of the input reference block 124 based on the input reference block 124 in the input module 100 is selected. As shown in FIG. 12c, in case that the B1 separated indication position in the input module 100 providing the five A-B type separation pairs is selected, the B1 separated indication position is selected when the very backward left position recognized based on the left edge of the input reference block 124 on which a finger is positioned is pressed, so that the input can be quickly and easily performed.

Second Embodiment

A data input device 1 using A-B type separation pairs 150 according to a second embodiment of the invention includes an input module 100 in which a pair input is performed within a contact area of a finger 102 provided at a predetermined position of a base 10 of electronic device and an input signal corresponding to the pair input is generated, and a control unit 400 which judges the input signal sensed at the pair input and processes an input command assigned to the corresponding input.

As shown in FIGS. 10c and 11b, the pair input according to the invention is performed in such a way that the input module 100 provides a number of A-B type separation pairs 150 which are disposed by each one pair along a separation reference line 106 as an array of A-B separated indication positions 152 in which a number of A separated indication positions 132 in an A separated segment and a number of B separated indication positions 142 in a B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through a separation reference point 104 within a contact area of a finger 102 of the input module 100, and an A separated indication position 132 and a B separated indication position 142 of the A-B separated indication position 152 of any one pair among the separation pairs 150 are selected together, so that new data different from the data assigned to the corresponding separated indication positions A1, B1, A2, B2, etc. is inputted.

For example, as shown in FIG. 11b, the pair input in the input module 100 may be performed by means of an input operation in which the separated indication position 132 and the B separated indication position 142 of the A-B separated indication position 152 forming one A-B type separation pair 150 are pressed together (CAB).

Here, in the pair input, a finger positioned in the middle of the input reference block 124 as shown in FIG. 10a presses the A and B separated indication positions 132 and 142 of the A-B separated indication position 152 together (CAB) as shown in FIG. 10c, so that new data different from the data assigned to the A and B separated indication positions 132 and 142 may be inputted. In this example, the input may be performed by means of an input operation that presses or touches each of the input selecting positions, and various types of input selecting operations may be further included.

As shown in FIG. 13a, the pair input according to the invention is performed in such a way that the input module 100 provides the three A-B type separation pairs A1-B1, A2-B2, and A3-B3 which are disposed by each one pair along the separation reference line 106 as an array of A-B separated indication positions 152 in which three A separated indication positions 132 in the A separated segment and three separated indication positions 142 in the B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through the separation reference point 104 within a contact area of a finger 102 of the input module 100, and the A separated indication position 132 and the B separated indication position 142 of the A-B separated indication position 152 of any one pair among the separation pairs 150 are selected together, so that new data different from the data assigned to the separated indication positions A1, B1, A2, B2, A3, and B3 is inputted. Here, the separation pairs are provided in the input reference block 124 in which the three A-B type separation pairs are continuously and adjacently arranged as a left-middle-right type around the separation reference point 104.

In addition, as soon as a fingertip is put on the input reference block 124, the whole input selecting positions corresponding to the three A-B type separation pairs 150 are recognized as each A-B type based or the middle of the input reference block.

Furthermore, the input reference block 124 is provided within an area in which the input selection can be performed by means of a short moving line of the rolling movement of a fingertip, so that a finger naturally returns to the central region of the input reference block 124 as soon as pressure applied by the finger or the finger contact is released after each of the input selections, and then a next input selecting operation may be continuously and quickly performed based on the middle of the input reference block 124.

As shown in FIGS. 13*b* and 13*c*, in the input module 100 according to the invention, even when one or more A-B type separation pairs 150 is further disposed outside the input reference block 124, an input selecting position of each separated indication position of a separation pair disposed outside the input reference block 124 is recognized as each A-B type selecting position of the left or right of the input reference block based on the input reference block 124 on which a finger is positioned, and each of the A-B type selecting positions may be recognized as a forward-backward type in the A separated segment direction and the B separated segment direction around the separation reference line 106, so that the pair input may be quickly performed.

As shown in FIG. 13*b*, the input module 100 according to the invention may be applied to electronic devices or portable terminals in a form that provides the input reference block 124 in which the three A-B type separation pairs 150 are continuously and adjacently arranged as a left-middle-right type around the separation reference point 104 and further provides one A-B type separation pair outside one side of the input reference block. When the separated indication position 110 disposed outside the input reference block 124 in the input module 100 is inputted, the input reference block 124 may be a reference so that each of the input selecting positions is recognized to the corresponding selection position. Here, as shown in FIG. 13*b*, the pair input according to the invention is performed in such a way that, an A separated indication position 132 and a B separated indication position 142 of an A-B separated indication position 152 of any one pair among four A-B type separation pairs, in which one A-B type separation pair 150 is further disposed outside one side of the input reference block 124 based on the input reference block 124 in such a size that the rolling movement of a fingerprint region 910 of a thumb tip may be performed, are selected together based on the separation reference point 104 which is a reference point and the separation reference line 106 passing through the separation reference point 104 within a contact area of a finger 102 of the input module 100, so that new data different from the data assigned to the corresponding separated indication positions 110 is inputted.

Referring to FIGS. 10*c* and 13*b*, an example of an input in which an A-B separated indication position 152 of a separation pair 150 disposed outside to the right of the input reference block 124 based on the input reference block 124 of the input module 100 is selected may be described. As shown in FIG. 13*b*, case that the very right pair A4-B4 among the four A-B type separation pairs provided in the input module 100 is selected, the very right separation pair A4-B4 disposed outside to the right of the input reference block is selected when the very right position recognized based on the right edge of the input reference block 124 is pressed, so that the input can be quickly and easily performed. Likewise, in the input module 100, when one separation pair is disposed outside to the left of the input reference block 124 based on the input reference block 124, the input operation may be applied.

As shown in FIG. 13*c*, the input module 100 according to the invention may be applied to electronic devices or portable terminals as a form that provides the input reference 124 in which the three A-B type separation pairs 150 which are continuously and adjacently arranged as a left-middle-right type around the separation reference point 104 and further provides two A-B type separation pairs outside both sides of the input reference block. When the separated indication position 110 disposed outside the input reference block 124 in the input module 100 is inputted, the input reference block 124 may be a reference so that each of the input selecting positions is recognized to the corresponding selection position.

Referring to FIG. 13*c*, an example of an input in which each separated indication position 152 of the separation pairs 150 respectively disposed outside the left and right side of the input reference block 124 based on the input reference block 124 in the input module 100 is selected may be described. As shown in FIG. 13*c*, in the input module 100 providing five A-B type separation pairs, the very left separation pair A1-B1 is selected when the very left position recognized based on the left edge of the input reference block 124 is pressed (CAB1), while the very right separation pair A4-B4 is selected when the very right position recognized based on the right edge of the input reference block 124 is pressed (CAB5), so that the input may be quickly and easily performed.

Figure 16:
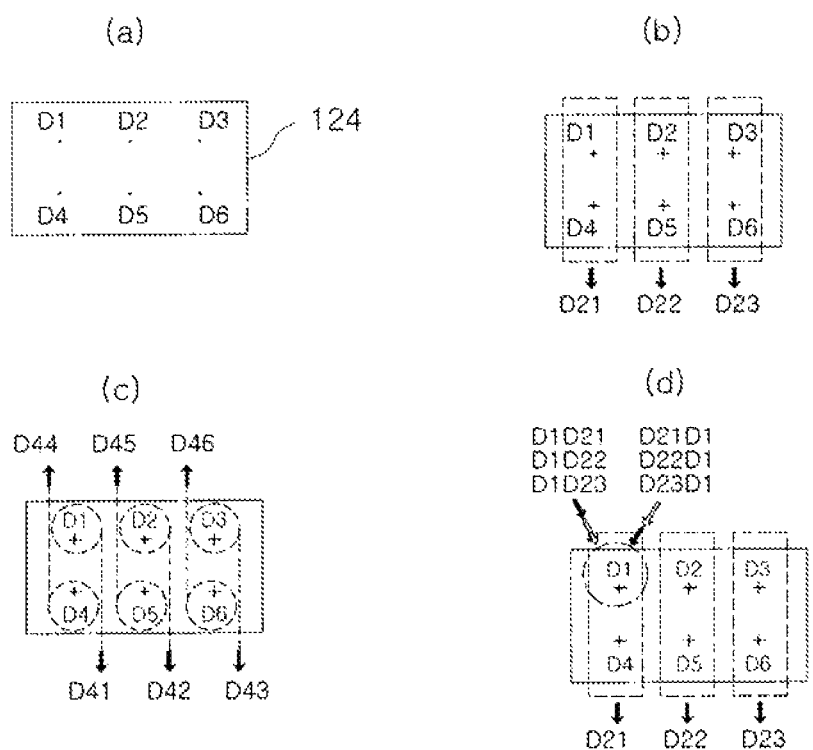
FIG. 16 is an exemplary view illustrating a data outputted according to various embodiments according to the invention.

Besides, FIG. 16 is a conceptual diagram of data which is generated according to the above-mentioned input performed based on the input reference block 124 in the input module 100, in the data input device 1 using the A-B type separation pairs 150 according to the invention.

Here, the input can be performed by means of various types of input operations including the above-mentioned rolling movement of a fingerprint region of a fingertip.

Besides, the control unit may judge and determine a corresponding input signal from one signal generated by means of an individual selection to the any one separated indication position among the three A-B type separation pairs of the input reference block 124 and then process the input signal as a separation input, or judge a corresponding input signal from two signals generated by means of selecting together the A separated indication position 132 and the B separated indication position 142 forming any one separation pair 150 and then process the input signal as a pair input. For example, referring to FIG. 10*c* or 11*b*, when the A separated indication position 132 and the B separated indication position 142 of the A-B separated indication position 152 of each separation pair 150 recognized based on the middle of the input reference block 124 among the three A-B type separation pairs 150 disposed in the input reference block 124 are pressed together (CAB) and two signals are generated, the control unit may judge and process the input signal as a pair input.

However, in the pair input, the A separated indication position 132 and the B separated indication position 142 of the separation pair 150 which is pressed by a finger (CAB) may fail to simultaneously make contact with a sensing sensor of a separation sensing unit 300. That is, the A separated indication position 132 and the B separated indication position 142 at the separation pair 152 may sequentially make contact with the sensing sensor, or the B separated indication position 142 and the A separated indication position 132 may sequentially make contact with the sensing sensor.

In this case, the control unit may judge and determine the two sequential signals as a pair input according to a preset time value and processes the signals to the pair input.

That is, in a selection to the separation pair 150 at the time of input, in case that a time difference between contact signals generated when the A separated indication position 132 and the B separated indication position 142 make contact with the sensing sensor is within the preset time value regardless of the order of signal generation, the selection is processed as a pair input. Here, the preset time value may be less than 0.2 seconds, or be judged through consideration of a typical time difference between simultaneous contacts. In addition, a corresponding input signal may be judged and determined from two different continuous signals generated at one separation pair and then be processed as a pair input, using other various methods.

When A-B separated indication position 152 of one separation pair in the input reference block 124 is continuously selected and four continuous signals are generated, the control unit may judge and determine whether two different signals are continuously inputted twice from the four continuous signals, and the process the corresponding input as a double input in the pair input, that is, a multi-step input. Here, the preset time value may be applied or other various methods may be used to process the input signal.

Third Embodiment

A data input device 1 using A-B type separation pairs according to the invention may provide an input module 100 in which the above-mentioned input is individually or continuously performed, or a separation pair combining input sequentially combining a separation input and a pair input can be performed.

The data input device 1 using the A-B type separation pairs 150 according to a third embodiment of the invention includes the input module 100 in which a separation pair combining input is performed within a contact area of a finger 102 formed at a predetermined position of a base 10 of electronic device and an input signal corresponding to the separation pair combining input is generated, and a control unit 400 which judges the input signal at the separation pair combining input and processes an input command assigned to the corresponding input.

Referring to FIGS. 10b to 10c or FIGS. 11a, 11b, and 11d, the separation pair combining input according to the invention is performed in such a way that the input module 100 provides a number of the A-B type separation pairs 150 which are disposed by each one pair along a separation reference line 106 as an array of A-B separated indication positions 152 in which a number of A separated indication positions 132 in an A separated segment and a number of B separated indication positions 142 in a B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through a separation reference point 104 within a contact area of a finger 102 of the input module 100, so that new data different from the data assigned to the separated indication positions 110 is inputted by means of a combination of the separation input in which one separated indication position 110 among the separation pairs 150 is selected and the pair input in which en A separated indication position 132 and a B separated indication position 142 of A-B separated indication position 152 of one pair among the separation pairs 150 are selected together.

Here, the input may be performed in a type of an input operation that presses or touches each input selecting position through the rolling movement of a fingerprint region 910 of a fingertip, and various types of input operations may be further included.

Figure 14:
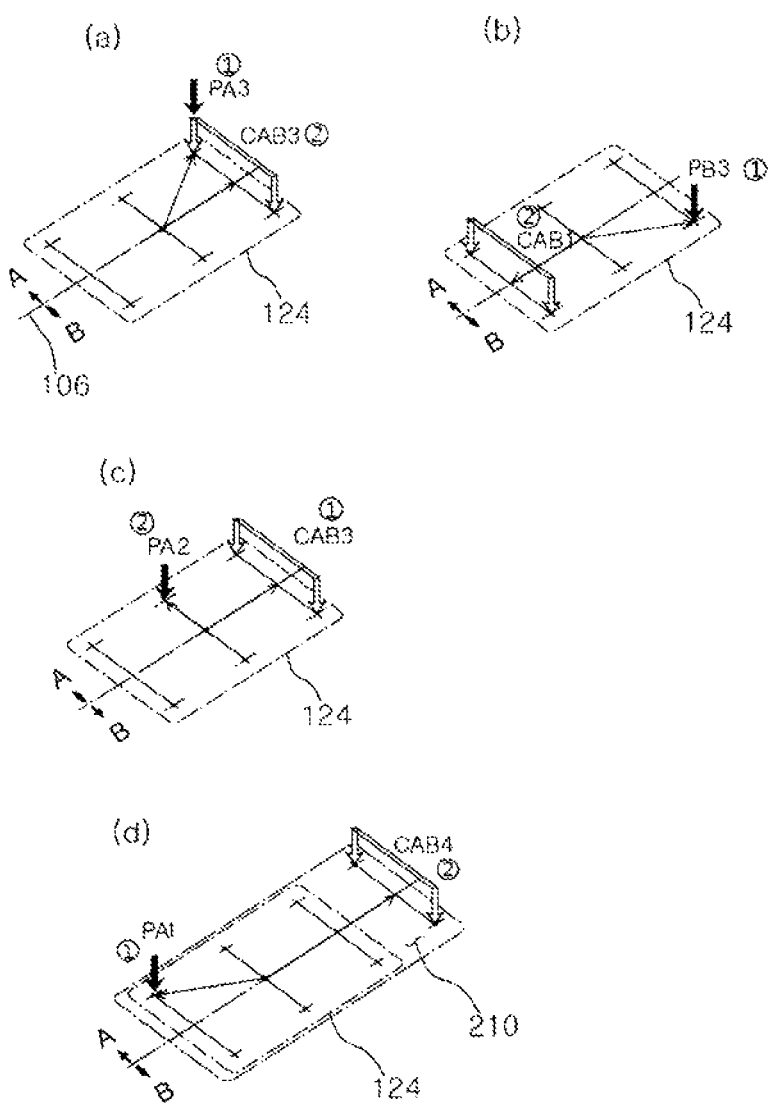
FIG. 14 is an exemplary view for explaining the separation pair combining input in various embodiments implemented based on the middle of the input reference block according to the invention.

FIG. 14 is a variety of exemplary views illustrating the separation pair combining input which is performed in the input module 100 providing a number of the A-B type separation pairs 150 according to the invention.

Specifically, FIG. 14a is an exemplary view illustrating the separation pair combining input which is performed by means of a sequential combination of the separation input and the pair input in the input reference block 124 of the input module 100. That is, in case that the separation input and the pair input are sequentially combined with each other at the right separation pair A3-B3 based on the middle of the input reference block 124 (①→②), the A3 separated indication position is pressed (PA3) and the separation input is performed when the forward right position recognized based on the middle of the input reference block 124 is selected (①), and after that, the A3 and B3 separated indication positions A3-B3 are pressed together (CAB3) and the pair input is performed when the right position recognized based on the middle of the input reference block 124 is selected (②), so that new data different from the data assigned to each of the separated indication positions 110 is inputted by means of the separation pair combining input.

Likewise FIG. 14b illustrates a case (①→②) in which the separation input at the B3 separated indication position and the pair input at the left separation pair A1-B1 are sequentially combined with each other based on the middle of the input reference block 124 in the input module 100. That is, the B3 separated indication position is pressed (PB3) and the separation input is performed when the backward right position recognized based on the middle of the input reference block 124 is selected (①), and after that the A1 and B1 separated indication positions A1-B1 are pressed together (CAB1) and the pair input is performed when the left position recognized based On the middle of the input reference block 124 is selected (②), so that the separation pair combining input is performed.

However, another separation pair combining input may be performed by means of the order of combination which is different from the above-mentioned separation pair combining input. That is, as shown in FIG. 14c (①→②), the A3 and B3 separated indication positions A3-B3 are pressed together (CAB3) when the right position separation pair recognized based on the middle of the input reference block 124 is selected, and after that, the A2 separated indication position is pressed (PA2) when the forward middle position recognized based on the middle of the input reference block 124 is selected (①), so that the separation pair combining input in which the pair input and the separation input are sequentially combined with each other is performed.

As shown in FIGS. 12b and 12c, FIGS. 13b and 13c, or FIG. 14d, in the input module 100 according to the invention, even when one or more A-B type separation pairs 150 is further disposed outside the input reference block 124, the input selecting position of each separated indication position 110 of the separation pair disposed outside the input reference block 124 is recognized as each A-B type selecting position of the left or right of the input reference block based on the input reference block 124 on which a finger is put, and each of the A-B type selecting position is recognized as a forward-backward type of the A separated segment direction and the B separated segment direction based on the separation reference line 106, so that the separation pair combining input can be quickly performed.

Referring to FIGS. 12*b* and 12*c*, FIGS. 13*b* and 13*c*, or FIG. 14*d*, the input module 100 according to the invention may be applied to electronic devices or portable terminals in a ions that provides the input reference block 124 in which the three A-B type separation pairs 150 are continuously and adjacently arranged as a left-middle-right type around the separation reference point 104 and one A-B type separation pair is further disposed outside one side of the input reference block.

For example, FIG. 14*d* is an exemplary view illustrating the separation pair combining input which is performed by means of a sequential combination of the separation input and the pair input at the four A-B type separation pairs 150 in which one A-B type separation pair 150 is further disposed outside to the right of the input reference block 124 based on the input reference block 124 in the input module 100. That is, the A1 separated indication position is pressed (PA1) when the forward left position recognized based on the middle of the input reference block 124 is selected (GA, and after that, the A4 and B4 separated indication positions A4-B4 are pressed together (CAB4) when the very right position recognized based on the right edge of the input reference block 124 is selected (②), so that the separation pair combining input, in which new data different from the data assigned to the separated indication positions 110 is inputted, is performed.

As described above, when the separated indication position 110 disposed outside the input reference block 124 in the input module 100 is selected by means of the separation pair combining input, the input reference block 124 may be a reference so that each of the input selecting positions is recognized to the corresponding selection positron.

Besides, FIG. 16 is a conceptual diagram of data which is generated according to the above-mentioned input performed based on the input reference block 124 in the input module 100, in the data input device 1 using the A-B type separation pairs 150 according to the invention.

FIG. 16*a* illustrates the number of data which can be inputted according to the separation input in the input reference block 124. That is, in the input reference block 124, when each of the separated indication positions A1, B1, A2, B2, C1, and C2 of the three A-B type separation pairs is individually selected once, the total six data are generated.

FIG. 16*b* illustrates the number of data which can be inputted according to the pair input in the input reference block 124. That is, in the input reference block 124, when each of the separation pairs A1-B1, A2-B2, and A3-B3 of the three A-B type separation pairs is individually selected once, the total three data are generated.

FIG. 16*d* illustrates the number of data which can be inputted according to the separation pair combining input in the input reference block 124. That is, the total forty five data may be generated by means of a combination of the separation input and the pair input in the input reference block 124. Here, new data different from the data assigned to each of the separated indication positions or each of the inputs as generated by means of a combination according to a continuous selection of any one or more inputs among the separation input or the pair input, so that the number of data may be further increased.

Referring to FIGS. 12*a*, 13*a*, and 16*d*, when the right position is selected in a state in which the forward left position recognized based on the middle of the input reference block 124 is selected, the separation pair combining input is performed by means of a combination of the separation input in which the separated indication position corresponding to the forward left position is selected and the pair input in which the A-B separated indication position of the separation pair corresponding to the right position is selected. That is, when the separation pair combining input is performed by means of a sequential combination of the separation input selecting the separated indication position A1 of the forward left, position and the pair input selecting the A-B separated indication position A3-B3 of the right position based on the middle of the input reference block 124, new data 'D1D23' is generated and displayed on a display unit 500 rather than the data "D1" assigned to the separation input selecting the separated indication position A1 and the data "D23" assigned to the pair input selecting the A-B separated indication position A3-B3.

Besides, the control unit judges and determines a corresponding input signal from three signals which are generated by means of a selective combination of the A separated indication position 132 and the B separated indication position 142 at any one separation pair 150 among the three A-B type separation pairs 150 of the input reference block 124, and then processes the input signal as a separation pair combining input. Here, the three signals may be generated as a type of a combination of one signal and another two different signals. In other words, as shown in FIGS. 10*b* and 10*c*, when the A separated indication position 132 or the B separated indication position 142 of any one separation pair among the three A-B type separation pairs 150 disposed an the input reference block 124 is individually pressed (PA or PB) and one signal is generated, and after that, the A separated indication position 132 and the B separated indication position 142 of any one separation pair are pressed together (CAB) and two signals are generated, or, conversely, the A separated indication position 132 and the B separated indication position 142 of any one separation pair are pressed together (CAB) and two signals are generated, and after that, the A separated indication position 132 or the B separated indication position 142 of any one separation pair is individually pressed (PA or PB) and one signal is generated, the control unit may judge and determine the corresponding input signals as a separation pair combining input. Here, when the separation input and the pair input are sequentially performed at any one separation pair 150, which is recognized based on the middle of the input reference block 124, among the three A-B type separation pairs 150 of the input reference block 124 and then three signals are generated, each of the inputs can be distinguished from each other and processed of the input according to the order of the signal generation.

For example, referring to FIGS. 12*a*, 13*a*, and 16*d*, in the left separation pair A1-B1 recognized based on the middle of the input reference block 124, one signal is generated by means of the separation input selecting the separated indication position A1 corresponding to the forward left position when the forward position of the separation pair is pressed, and after that, two signals are generated by means of the pair input selecting the A-B separated indication position A1-B1 corresponding to the left position when the separation pair is pressed. Here, the control unit judges and determines a corresponding input signal from the three signals, and then processes new data "D1D21" different from the data "D1" or "D4" respectively assigned to the A1 separated indication position and the B1 separated indication position of the left separation pair A1-B1.

Conversely, referring to FIGS. 12a, 13a, and 16d, in the left separation pair A1-B1, two signals are generated by means of the pair input selecting the A-B separated indication position A1-B1 corresponding to the left position when the separation pair is pressed, and after that, one signal is generated by means of the separation input selecting the separated indication position A1 corresponding to the forward left position when the forward position of the separation pair is pressed. Here, the control unit judges and determines a corresponding input signal from the three signals, and then processes new data "D21D1" different from the data "D1" or "D4" respectively assigned to the A1 separated indication position and the B1 separated indication position of the left separation pair A1-B1.

As described above, when any one separated indication position 110 at one separation pair is selected in an overlapping manner and three signals are generated, the control unit judges whether the separation pair combining input is performed by a pair input after a separation input or by a separation input after a pair input from the three signals, and distinguishes inputting order of the inputs, and then processes the input of data assigned to the corresponding input.

However, in case of the three signals which are generated when each of the separated indication positions 110 of the separation pairs 150 makes contact with a sensing sensor, the contact made with the separated indication position 110 by means of the pair input after the separation input and the contact made with the separated indication position 110 by means of the separation input after the pair input may be identical with each other.

In other words, referring to FIG. 16d as an exemplary, in case that the pair input is performed at the left separation pair A1-B1 recognized based on the middle of the input reference block 124, each of the separated indication positions by means of the pair input after the separation input may make contact with the sensing sensor in the order such as A1 separated indication position→B1 separated indication position→A1 separated indication position when a signal by means of simultaneous contact fails to be generated. In addition, each of the separated indication positions by means of the separation input after the pair input may make contact with the sensing sensor in the order such as A1 separated indication position→B1 separated indication position→A1 separated indication position.

As describe above, in case that each of the separated indication positions 110 makes contact with the sensing sensor in the same order when the different inputs are made, the control unit may judge two continuous signals having a short time interval between contact signals as the pair input according to a preset time value from three signals generated according to the order of the combination of the different inputs, and then process the inputs as different separation pair combining inputs based on the two continuous signals of the pair input.

Figure 10:
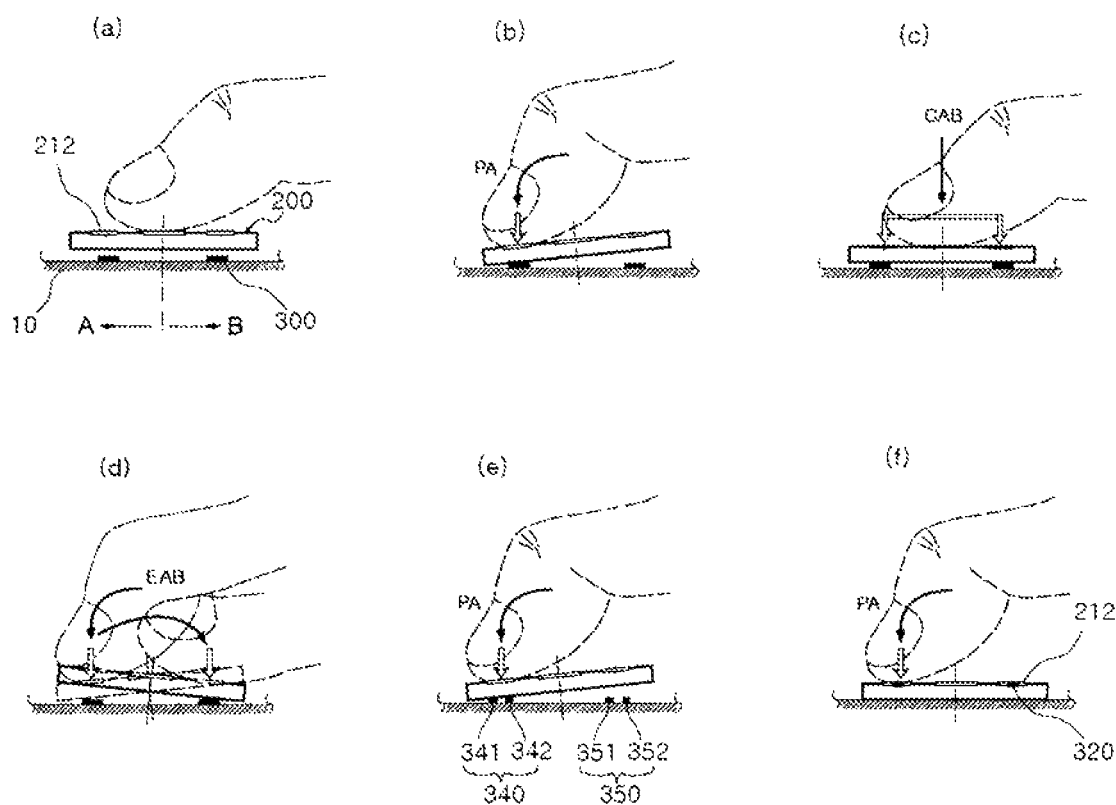
FIG. 10 is an exemplary view illustrating types of input operations of rolling movements of a finger during a separation input, a pair input, and a pair alternating input according to various embodiments of the invention.
Figure 11:
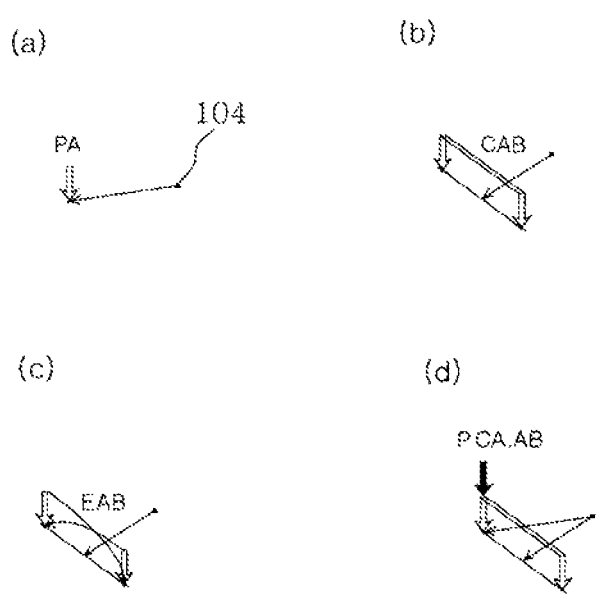
FIG. 11 is an exemplary view for explaining each input operation of a separation input, a pair input, a separation pair combining input, and a pair alternating input according to various embodiments of the invention.
Figure 12:
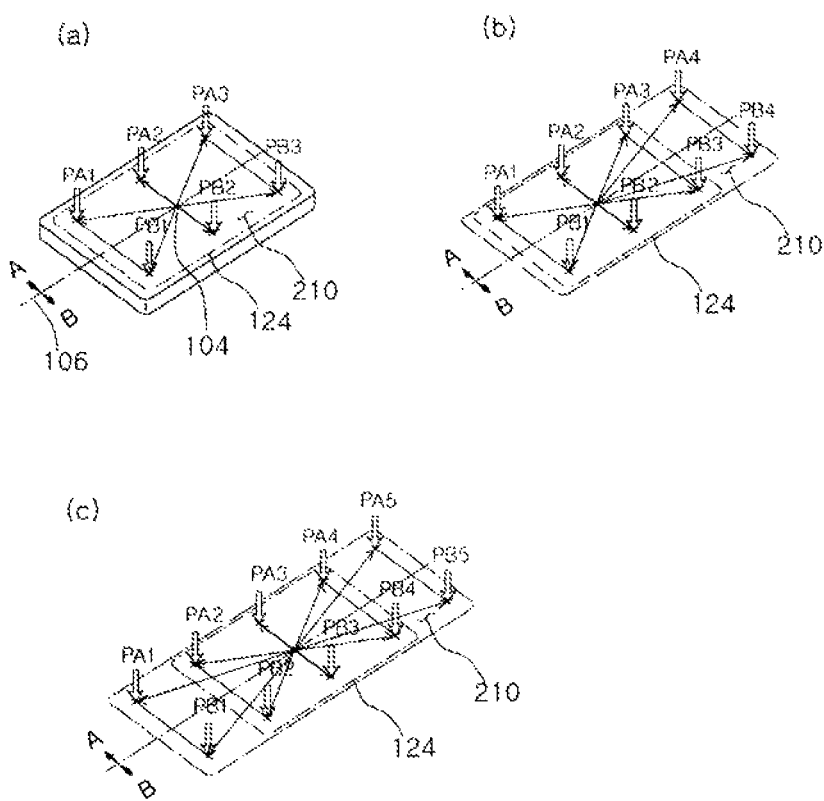
FIG. 12 is an exemplary view for explaining the separation input in various embodiments implemented based on the middle of the input reference block according to the invention.

In other words, referring to FIG. 10 or 11, in case of the left separation pair A1-B1, when continuous contact signals are generated in a short time interval during the A1 separated indication position the separated indication position among the three signals, the control unit judges the signals as a separation pair combining input by means of the separation input (PA) after the pair input (CAB), or when continuous contact signals are generated in a short time interval during the B1 separated indication position→the A1 separated indication position among the three signals, the control unit judges the signals as a separation pair combining input by the pair input (CAB) after the separation input (PA), and then processes the input as new data that are respectively different from each other. Here, the preset time value may be less than 0.2 seconds, or be judged through consideration of a typical time difference between simultaneous contacts.

For another example, in case that a combination of the separation input and the pair input is performed at any one separation pair A-B among the three A-B type separation pairs 150 disposed in the input reference block 124, wherein in case that simultaneous contact signals fail to be generated and three signals are continuously generated when the pair input is made, two continuous signal values generated when the pair input is made are processed as a database of the pair input signal value, so that each of the pair inputs may be processed. That is, when two continuous signals having a short time interval between contact signals are sensed during the separation input and the pair input which are performed at the separation pair, an input is processed as the input value corresponding to the pair input in the corresponding database. In addition, the corresponding input signal may be judged from three signals generated at one separation pair 150 by means of a variety of methods and be processed of the input as the separation pair combining input.

Fourth Embodiment

Figure 6:
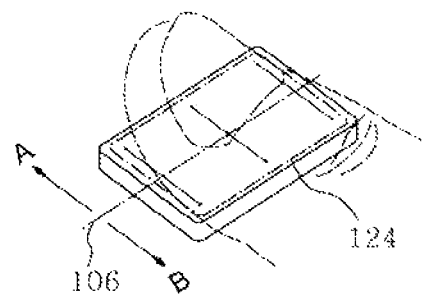
FIG. 6 is a perspective view illustrating the input reference block which is provided to en input module or an input unit according to an embodiment of the invention.

Referring to FIGS. 3 and 6, in a data input device 1 using A-B type separation pairs according to the invention, an input module 100 may consist of an input unit 200 which provides a number of A-B type separation pairs 150 which are disposed by each one pair along a separation reference line 106 as an array of A-B separated indication positions 152 in which a number of A separated indication positions 132 in an A separated segment 130 and a number of B separated indication positions 142 in a B separated segment 140 which are ambilaterally divided from and corresponded each other as a face-to-face type based on the separation reference line passing through the separation reference point 104 which is a reference position, and an input selecting position corresponding to each of the separated indication positions 110 of the separation pairs is individually or continuously selected, so that any one or more inputs among a separation input, a pair input, and a separation pair combining input is individually or continuously performed; and a separation sensing unit 300 for generating a corresponding input signal at an input, in which one or more sensing sensors sensing each contact when the input is made may be provided, is included in the input module.

Referring to FIGS. 3 and 7, the input unit 200 may be configured so as to include an input reference block 124 in which three A-B type separation pairs are continuously and adjacently arranged as a left-middle-right type around the separation reference point 104.

Accordingly, the three A-B type separation pairs of the input reference block 124 are positioned within the rolling movement range of a fingerprint region of a thumb tip, and an input selecting position corresponding to the separated indication position 110 of each separation pair of the input reference block is recognized as a left-middle-r a type or a forward and backward left, forward and backward middle, and forward and backward right type around the middle of a fingertip, while at the same time the three A-B type separation pairs of the input reference block are recognized as one input block type with in a fingerprint region 910 of the thumb tip when a finger is put on the input reference block, so that an input selecting position of a separation pair disposed outside the input reference block is recognized as each A-B type separation pair of the left or right of the input reference block based on the input reference block, and thus, a data input may be individually or continuously performed.

Here, an input selecting segment 220, which is formed so that the corresponding separated indication position 110 is selected at the position corresponding to each of the separated indication positions 110 of the separation pair 150, may be further included at the upper side of the input module 100 or the input unit 200. Here, the input selecting segment 220 may be provided in the same number as that of each separated indication position 110 disposed in the input module 100 or the input unit 200, and an input surface 210 with which an input means 900 makes contact may be formed as the input selecting segment. In addition, referring to FIG. 7, the input selecting segment 220 may be included within an input contact region 212 in the input module 100 or the input unit 200. Alternatively, the input contact region may be provided as the input selecting segment 220 as shown in FIG. 7.

Referring to FIG. 10b, lie, or 124, when the input module 100 or the input unit 200 according to the invention provides the input reference block 124 and the input selecting segment 220 in which the three A-B type separation pairs 150 are continuously and adjacently arranged as a left-middle-right type around the separation reference point 104, the separation input is performed in such a way that the input module or the input unit provides the three A-B type separation pairs 150 which are disposed by each one pair along the separation reference line 106 as an array of A-B type separated indication positions 152 in which the three A separated indication positions 132 in the A separated segment 130 and the three B separated indication positions 142 in the B separated segment 140 are separated from and corresponded each other as a face-to-face type based on the separation reference line 106, in the two sides, that is, the A separated segment 130 and the B separated segment 140 which are ambilaterally divided from the separation reference line based on the separation reference line 106 passing through the separation reference point 104 within a contact area of a finger 102 of the input module 100 or the input unit 200, and any one separated indication position 110 among the separation pairs 150 is selected, so that the data assigned to the separated indication position is inputted.

In addition, referring to FIG. 10c, 11b or 13a, the pair input is performed in such a way that the A separated indication position 132 and the B separated indication position 142 of A-B separated indication position 152 of any one pair among the separation pairs 150 of the input module 100 or the input unit 200 are selected together, so that new data different from the data assigned to the corresponding separated indication positions is inputted.

Furthermore, referring to FIGS. 10b to 10c, or FIGS. 11a, 11b, and 11d, the separation pair combining input is performed in such a way that new data different from the data assigned to each of the separated indication positions 110 is inputted by means of a sequential combination of the separation input selecting one separated indication position 110 among the separation pairs 150 of the input module 100 or the input unit 200 and the pair input selecting together the A separated indication position 132 and the B separated indication position 142 of A-B separated indication position 152 of one pair among the separation pairs 150 of the input module 100 or the input unit 200.

Here, in the separation pair combining input, when the order of input operation of the separation input and the pair input are different from each other, the control unit judges and determines an input signal from a signal sensed at the time of each input, and then processes the input of different data assigned to each of the corresponding inputs.

As soon as a fingertip is put on the input module 100 or the input unit 200, each of the input selecting segments 220 is recognized as a left-middle-right type of A-B type selecting position based on the middle of the input reference block 124. Here, the left-middle-right type of the A-B type selecting position may be recognized as the forward-backward type of the A separated segment direction and the B separated segment direction based on the separation reference line 106. Accordingly, users can individually or continuously perform any one or more inputs among the separation input, the pair input, or the separation pair combining input, in a state in which the users easily and familiarly recognize each of the input selecting segments as the A-B type selecting position.

Here, the input may be performed in a type of an input operation that presses or touches each of the input selecting positions through the rolling movement of a fingerprint region 910 of a fingertip, or various types of input selecting operations may be further included.

In the input module 100 or the input unit 200 according to the invention, even when one or more A-B type separation pairs 150 is further disposed outside the input reference block 124, the input selecting segment 220 corresponding to each separated indication position of the separation pair disposed outside the input reference block 124 is recognized as each A-B type selecting position of the left or right of the input reference block based on the input reference block 124 on which a finger is put, and each of the A-B type selecting positions may be recognized as the forward-backward type of the A separated segment direction and the B separated segment direction based on the separation reference line 10E, so that each input can be quickly performed.

Figure 26:
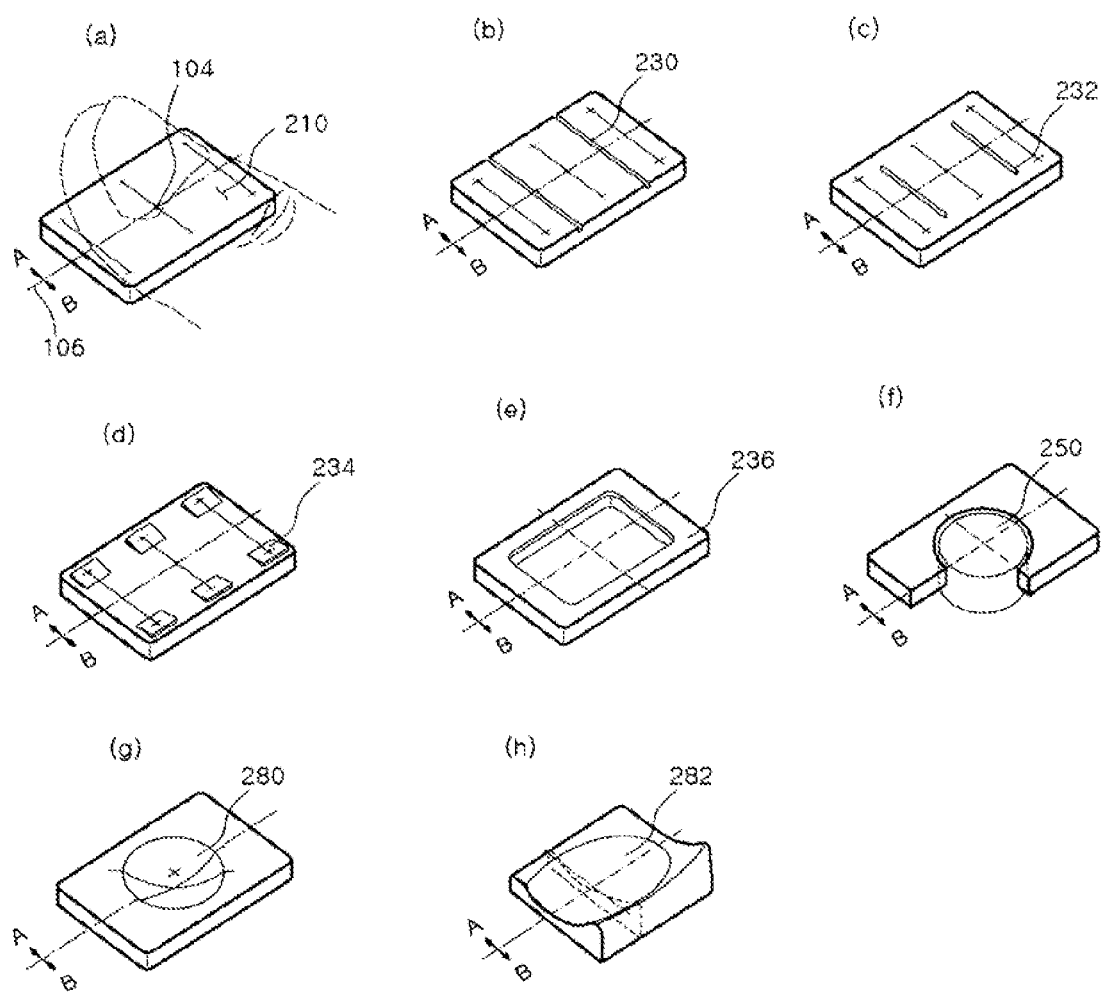
FIG. 26 is an exemplary view illustrating the input module or the input unit provided in a variety of types according to the invention.

Here, referring to FIG. 26a, the input selecting segments 220 may be wholly or partially provided at the upper side of the input module 100 or the input unit 200. For example, referring to FIGS. 26a to 26h, the input selecting segment may be provided as one input surface 210 or in the same number as that of each of the separated indication positions 110 disposed in the input module 100 or the input unit 200.

For example, the input selecting segments 220 may be divided into a left-middle-right type of the input selecting segment by means of two or more separating grooves 230 as shown in FIG. 26b based on the middle of the input reference block 124 provided in the input module 100 or the input unit 200, and then recognized as the same types as the three A-B type separation pairs 150. That is, the positions of the input selecting segments respectively recognized as are input selecting positions of the same type (that is, a left-middle right type of the input selecting segment) as the three A-B type separation pairs 150 which are recognized as a left-middle-right type of the separation pairs based on the middle of the input reference block 124. Besides, the input selecting segment may be provided in a form which is divided into the A separated segment 130 and the B separated segment 140 by means of a single separating groove 230 provided along the separation reference line 106. Here, the separating groove may be wholly or partially formed in any one or more shapes of a straight line, a curve, or a wavy pattern, and wholly or partially provided in a symmetric or asymmetric type.

Furthermore, the input selecting segments 220 may be divided into the A separated segment 130 and the B separated segment 140 by means of a separating groove 230 provided at the position of the separation reference line 106 as the same form as the separation reference line 106.

Here, as shown in FIGS. 1a to 1e, the separated indication positions 110 corresponding to the separation reference line 106 or the input selecting segments 220 may be formed as any one or more shapes among a straight line (FIG. 1a), a curve (FIG. 1c), or a wavy pattern (FIG. 1e). In addition, the separating reference line 106 may be wholly or partially provided in a symmetric type, an asymmetric type divided by a straight line (FIG. 1b), or an asymmetric type divided by a curve (FIG. 1d) based on the middle of the input unit 200.

Also, the input selecting segments 220 may be divided into a left-middle-right type of the input selecting segments by means of a protuberance type of two or more separating lines 232 based on the middle of the input reference block 124 provided in the input module 100 or the input unit 200 as shown in FIG. 26c, and then be recognized as the same types as the three A-B type separation pairs 150. That is, the position of each of the input selecting segments is recognized as the input selecting position as the same types (that is, a left-middle-right type of the input selecting segments) as the three A-B type separation pairs 150 which are recognized as a left-middle-right type of separation pairs based on the middle of the input reference block 124. Besides, the input selecting segments may be provided in a form which is divided into the A separated segment 130 and the B separated segment 140 by means of the single separating line provided along the separation reference line 106. In other words, the input selecting segments may be provided as a form which is divided into two or more input selecting segments by means of one or more separating lines 232. In this case, the separating lines may be wholly or partially formed in any one or more shapes of a straight line, a curve, or a wavy pattern, and wholly or partially provided in a symmetric or asymmetric type.

In addition, the input selecting segments 220 may be provided on the input module 100 or the input unit 200 as type of predetermined separated protuberance 234. For example, as shown its FIG. 26d, the input selecting segments 220 may be provided at the corresponding input selecting position as a type of six separated protuberances corresponding, in number, to each of the separated indication positions 110 of the three A-B type separation pairs 150 of the input reference bock 124 based on the middle of the input reference block 124 provided in the input module 100 or the input unit 200.

Furthermore, the input selecting segments 220 may be provided on the input module 100 or the input unit 200 as a type of predetermined protruding frame 236. That as shown in FIG. 26e, the input selecting segments may be provided as a protruding frame which has a predetermined width and is formed along the input selecting position corresponding to each of the separated indication positions 110 of the three type separation pairs 150 based on the middle of the input reference block 124 provided in the input module 100 or the input unit 200.

The input selecting segments 220 provided on the input module 100 or the input unit 200 may further include a variety of types which enable each of the A-B type separation pairs 150 or each of the separated indication positions 110 of the input reference block 124 to be individually selected.

For example, the input selecting segments 220 may be provided as any one or more among a separately-provided press key, a button, and a switch so as to correspond to the input selecting position of each of the A-B type separation pairs 150 or each of the separated indication positions 110 of the input reference block 124.

Besides, the input module 100 according to the invention may be provided so as to be applied to electronic devices or portable terminals providing various types of interfaces.

For example, as shown in FIG. 28a, the input modules 100 and 100' may be included in a holding type interface 700 which is provided to a holder 702 contacted with and separated from a base 10. In this example, the input module or the interface further includes a transmitting and receiving unit in which an input command of a data assigned to a corresponding input based on an input signal generated when the input is made is transmitted to and received from the base of a connected device through any one or more methods among a wired method or a wireless method.

In addition, the input modules 100 and 100' may be included in a detachable type interface 720 which can be coupled with and decoupled from a base 10 as shown in FIG. 28b and the input module may be included in a wired type interface 740 which can be connected with the wire to the base as shown in FIG. 28c, or the input module may be included in a wireless type interface 760 which can be wirelessly connected to the base providing a display unit 600 as shown in FIG. 20d.

In this case, each of the interfaces further includes a wired or wireless transmitting and receiving unit which transmits and receives an input command of a data assigned to a corresponding input to and from a base 10 of a connected device when the input is made, and may include a function key or one or more side keys at a predetermined position so that the input is performed.

Here, any one or more among the holding type interface 700, the detachable type interface 720, the wired type interface 740, or the wireless type interface 760 may be used as a menu window controller adjusting an input menu window 660. In this case, the menu window controller may be provided so as to perform controls of the input menu window or a variety of operations such as or pointing, search, enlarge view, shrink view, modify, start, stop, and move of data in the input menu window.

Any one or more interfaces among the above-mentioned interface may further include one or more display units 600. Here, the display units may be provided as separation sensing units 300, touch sensing units 320, or touch screens which senses a finger contact in this case, the display units may display one or more data display segments 620, or any one or more interfaces among each of the interfaces may enable a designated input recognition means to be operated in response to contact made when an input selection is made. Here, although the input recognition means may include a designated sound, vibration, etc., the input according to the invention is not limited thereto.

Fifth Embodiment

A data input device 1 using A-B type separation pairs 150 according to a fifth embodiment of the invention includes an input module 100 in which a pair alternating input is performed within a contact area of a finger 102 provided in a predetermined position of a base 10 of an electronic device and an input signal corresponding to the pair alternating input is generated, and a control unit 400 which judges the input signal at the pair alternating input and processes an input command assigned to the corresponding input.

Here, as shown in FIGS. 10d and 11c, the pair alternating input according to the invention is performed in such a way that the input module provides a number of A-B type separation pairs 150 which are disposed by each one pair along a separation reference line 106 as an array of A-B separated indication positions 152 in which a number of A separated indication positions 132 in the A separated segment and a number of B separated indication positions 142 in the B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through a separation reference point 104 within a contact area of a finger 102 of the input module 100, and the A separated indication position 132 and the B separated indication position 142 of the A-B separated indication position 152 of any one pair among the separation pairs 150 are continuously selected in a sequential manner, or, conversely, the B separated indication position 132 and the A separated indication position 132 are continuously selected in a sequential manner, so that new data different from the data assigned to the corresponding separated indication positions A1, B1, A2, B2, etc. is inputted.

Here, when the pair alternating input is made, a finger positioned in the middle of an input reference block 124 as shown in FIG. 10a continuously presses the A separated indication position 132 and the B separated indication position 142 in a sequential manner as shown in FIG. 10d, so that new data different from the data assigned to the A separated indication position 132 and the B separated indication position 142 is inputted.

Figure 15:
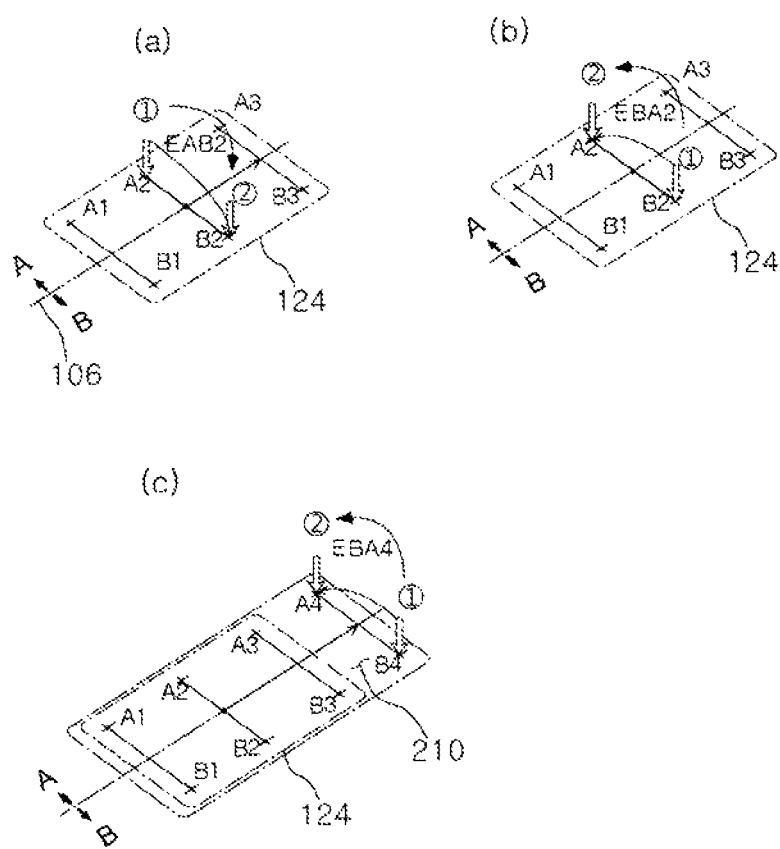
FIG. 15 is an exemplary view for explaining the pair alternating input in various embodiments implemented based on the middle of the input reference block according to the invention.

As shown in FIG. 15a, the pair alternating input according to the invention is performed in such a way that the input module provides three A-B type separation pairs 150 A1-B1, A2-B2, and A3-B3 which are disposed by each one pair along the separation reference line 105 as an array of A-B separated indication positions 152 in which three A separated indication positions 132 in the A separated segment and three B separated indication positions 142 in the B separated segment are separated from and corresponded each other as a face-to-face type based on the separation reference line 106, in the two sides, that is, the A separated segment 130 and the B separated segment 140 which are ambilaterally divided from the separation reference line based on the separation reference line 106 passing through the separation reference point 104 within a contact area of a finger 102 of the input module 100, and the A separated indication position 132 and the B separated indication position 142 of the A-B separated indication position 152 of any one pair among the separation pairs 150 are continuously selected in a sequential manner, or, conversely, the B separated indication position 142 and the A separated indication position 132 are continuously selected in a sequential manner, so that new data different from the data assigned to the corresponding separated indication positions A1, B1, A2, B2, A3, and B3 is inputted. Here, the separation pairs are provided in the input reference block 124 in which the three A-B type separation pairs are continuously and adjacently arranged as a left-middle-right type around the separation reference point 104, and an input signal by means of a continuous and sequential selection to the A separation indicated position 132 and the B separated indication position 142 as well as another input signal by means of a continuous and sequential selection to the B separated indication position 142 and the A separated indication position 132 at the A-B separated indication position 152 of the one pair, that is, two input signals generated by means of the order of alternating input are processed of input as the data that are assigned differently from each other In addition, when a fingertip is put on the input reference block 124, the total input selecting positions corresponding to the three A-B type separation pairs 150 are recognized as an A-B type based on the middle of the input reference block 124.

For example, as shown in FIG. 15a, in case that the pair alternating input is performed at the A2 separated indication position and the B2 separated indication position based on the middle of the input reference block 124, when the forward middle position and the backward middle position recognized based on the middle of the input reference block 124 are continuously selected in a sequential manner (①→②), so that new data different from the data assigned to the forward middle position A2 separated indication position and the backward middle position B2 separated indication position is processed of input, and then the pair alternating input is performed.

In other words, referring to FIGS. 15a and 16c, when the A2 separated indication position and the B2 separated indication position at the middle separation pair A2-B2 recognized based on the middle of the input reference block 124 are continuously selected in a sequential manner and then the pair alternating input is performed, new data "D42" is inputted instead of "D2" or "D5" assigned to each of the separated indication positions.

Conversely, referring to FIGS. 15b and 16c, when the B2 separated indication position and the A2 separated indication position at the middle separation pair A2-B2 are continuously selected in a sequential manner and then the pair alternating input is performed, new data "D45" is inputted instead of "D5" or assigned to each of the separated indication positions.

Accordingly, a new different data "D42" or "D45" is inputted, based on the order of the continuous inputs when the input selection is made at the middle separation pair (A2-B2).

In the input module 100 according to the invention, even when one or more A-B type separation pairs 150 is further disposed outside the input reference block 124 as shown in FIG. 15c, the input selecting position of each of the separated indication positions 110 of the separation pairs outside input reference block 124 is recognized as each A-B type selecting position of the left or the right of the input reference block based on the input reference block 124 on which a finger is positioned, and each of the A-B type selecting positions is recognized as a forward-backward type of the A separated segment direction and the B separated segment direction based on the separation reference line 106, so that the pair alternating input may be quickly performed.

In case of four A-B type separation pairs in which one A-B type separation pair 150 is further disposed outside to the left or right of the input reference block 124 in the input module 100, the input reference block 124 may be a reference so that an input selecting position of each of the input selecting positions 110 formed outside the input reference block 124 is recognized to the corresponding selection position.

For example, referring to FIG. 15c, the one very right separation pair A4-B4 formed outside the input reference block 124 is recognized as the right separation pair A4-B4 of the input reference block based on the input reference block 124.

In this example, as shown in FIG. 15c, in case that the pair alternating input is performed at the very right separation pair A4-B4, which is recognized based on the input reference block 124, among the four A-B type separation pairs 150 in the input module 100, when a position separated farther to the right from the right edge of the input reference block is imaginarily selected, the very right separation pair (A4-B4) of the input reference block is selected, so that the input can be easily and quickly performed by means of an input operation selecting the very backward right position (B4 separated indication position) and the very forward right position (A4 separated indication position) of the input reference block in an input operation by means of a sequential and continuous selection (①→②).

In this case, the control unit can distinguish between the corresponding input signals from two continuous signals sequentially generated when the pair alternating input is made and two signals simultaneously generated when the above-mentioned pair input is made, and then process the input as a pair alternating input or a pair input.

For example, when a pressure sensor is included in a separation sensing unit 300 corresponding to the input reference black 124, the pair alternating input and the pair input may be distinguished from each other and processed based on a difference between preset pressure values of the pressure sensor. That is, in case that the A separated indication position and the B separated indication position, or the B separated indication position and the A separated indication position of the separation pair 150 continuously make contact with the pressure sensor of the separation sensing unit in inputting order of the inputs, the pair alternating input is judged and the data assigned to the input is inputted when a pressure vale by means of continuous contact between the A separated indication position and the B separated indication position, or the B separated indication position and the A separated indication position is less than 1 to 3, while the pair input is judged and the data assigned to the input is inputted when the pressure vale by means of continuous contact is more than 3.

Alternatively, the pair alternating input and the pair input may be distinguished from each other and processed based on a preset time value in the control unit. That is, in case that the A separated indication position and the B separated indication position, or the B separated indication position and the A separated indication position of the separation pairs 150 continuously make contact with a sensing sensor of the separation sensing unit 300 in inputting order of the inputs, the pair input is judged and the data assigned to the input is inputted when a time difference between signals generated when the A separated indication position and the B separated indication position, or the B separated indication position and the A separated indication position make contact with the sensor is within the preset time value, while the pair alternating input is judged and the data assigned to the input is inputted when the time difference exceeds the preset time value. Here, a reference of the preset time value may be determined as 0.2 seconds, or through consideration of a typical time difference between continuous contacts.

Besides, the pair alternating input and the separation input may be distinguished from each other and processed based on a preset time value in the control unit. That is, in case that the A separated indication position and the B separated indication position, or the B separated indication position and the A separated indication position in a single separation pair 150 continuously make contact with the sensing sensor of the separation sensing unit 300 in inputting order of the inputs, an one-time pair alternating input is judged and the data assigned to the input is inputted when the time difference between signals generated when the A separated indication position and the B separated indication position, or the B separated indication position and the A separated indication position continuously make contact with the sensor is within the preset time value, while each continuous separation input is judged and the data assigned to each of the inputs is inputted when the time difference exceeds the preset time value. Here, a reference of the preset time value may be determined as 0.3 seconds, or through consideration of a typical time difference between continuous contacts.

When any one separated indication position 110 among the A-B separated indication positions 152 of the three A-B type separation pairs disposed in the input reference block 124 is continuously selected twice and then two continuous signals are generated, the control unit may judge input signals based on the two continuous signals and then process the corresponding inputs as a double input in the separation input, that is, a multi-step input. Here, the preset time value may be applied to process the input signals, or other various methods may be used.

Sixth Embodiment

An input module 100 according to the invention may be provided so that continuous signals of two or more times are generated due to a strength difference between applied pressures when a separation input is made, and thus, multi-step inputs of two or more steps cart be performed. Here, a separation sensing unit 300 including an elastic member 240 which responds step-by-step according to the strength of pressure applied to the input module 100 or a lower side of the input module may be provided. Alternatively, another elastic member 240 which can make contact, step-by-step, with each separated indication position 110 of three or more type separation pairs may be designated as a variety of types at a predetermined position of the input module 100.

In this case, the elastic member 240 may be provided so as to include a conductive material generating a signal when contact is made, or to be deformable according to types or input operations of the input module 100. In addition, the separation sensing unit 300 may be provided so that a variety of sensing sensors including a pressure sensor is provided, and thus, multi-step signals of two or more steps may be generated by means of the continuous signals of two or more times.

In the input module 100, when multi-step input signals of two or more steps are generated by means of the continuous signals of two or more times generated by means of a stepwise selection of two or more steps at the separation input, a control unit 400 judges and determines a multi-step input performed by means of the stepwise selection of two or more steps based on the multi-step input signals of two or more times, and then extracts new data different from the data assigned to each separated indication position 110 of the input module 100 from a memory unit based on the judged and determined multi-step input to process the extracted data as a multi-step input.

For example, in the multi-step separation input in which the input selection is divided into two steps pressing the position corresponding to each of the separated indication positions 110 disposed in the input reference block 124 of the input module 100, the control unit 400 may judge whether a separation input in the second step is performed based on a preset value of waiting time after a separation input in the first step is made.

In this example, the control unit may immediately process the separation input in the first step rather than waiting until the separation input is judged based on the preset value of waiting time after the separation input in the first step is made. That is, when the separation input in the second step is performed within the preset value of waiting time, the control unit immediately cancels the separation input in the first step and changes the input into the separation input in the second step, so that the input time may be prevented from being delayed until the separation input is judged based on the preset value of waiting time.

In case that the separation sensing unit 300 is provided as a pressure sensor, an input may be judged based on a maximum pressure value generated within the preset value of waiting time. That is, when the control unit does not wait until the separation input is judged based on the preset value, of waiting time and the separation input in the first step is performed, the separation input is immediately processed, while, when the separation input in the first step is released, the control unit immediately cancels the separation input in the first step and processes the separation input in the second step in case that a sensed value corresponding to the separation input in the second step is further sensed before the separation input in the first step is released.

In addition, in the multi-step separation input in which the input selection is divided into two steps pressing the position corresponding to each of the separated indication positions 110 disposed in the input reference block 124 of the input module 100, the control unit 400 may distinguish and judge between the separation input in the first step and the separation input in the second step, based on a preset value of sensing time of the separation sensing unit 300 which senses the input.

For example, the control unit 400 may judge the input as the separation input in the first step when an input sensing time in the separation sensing unit 300 is below 0.3 seconds, and also judge the input as the separation input in the second step when the input sensing time exceeds 0.3 seconds.

The control unit 400 may apply a method for processing the multi-step input signals of two or more steps according to the multi-step input to each multi-step input including a pair input or a separation pair combining input except for the separation input, and process the corresponding data as a multi-step input, such as a multi-step pair input or a multi step separation pair combining input.

Likewise, the method for processing a multi-step input signal may be applied to four or more A-B type separation pairs 150 provided in the input module 100 according to the invention.

Figure 22:
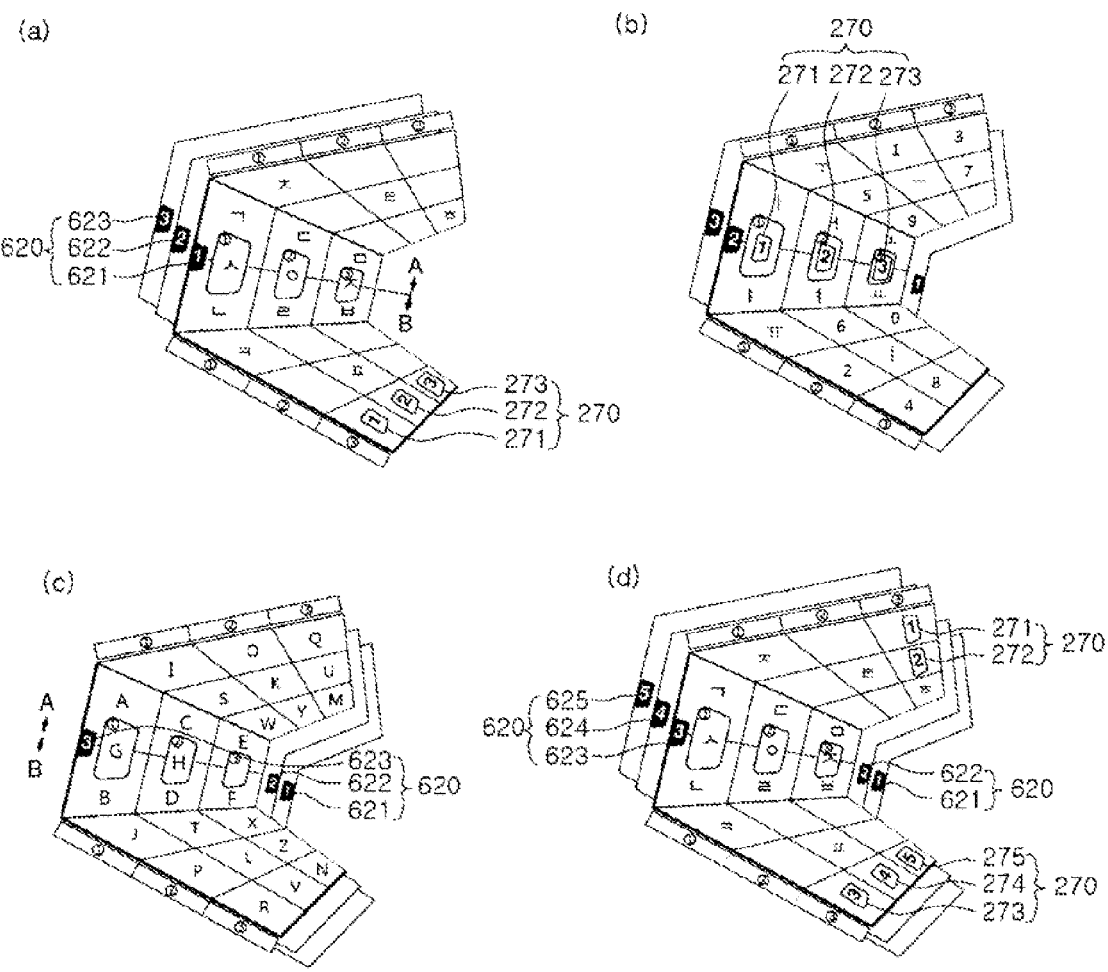
FIG. 22 is an exemplary view for explaining an input performed around the middle of the input reference block in a multi-step layer input mode among the input modes of various embodiments, in the input reference block according to the invention.

Besides, the input module 100 according to the invention may be configured so that a data is assigned to each of the separated indication positions 110 of the input reference block 124 in which three A-B type separation pairs 150 are provided based on a separation reference point 104 which is a reference position and the separation reference line 106 passing through the separation reference point 104, as shown in FIG. 22.

FIG. 22a is an exemplary view illustrating a multi-step layer input mode in which Hangeul consonants are respectively assigned and displayed to each of the separated indication positions 110 of the three A-B type separation pairs 150 disposed in the input reference block 124. Here, as shown in FIG. 22a, in the multi-step layer input mode consisting of a plurality of layer input modes among an input modes for inputting data, function commands of one or more function keys 270 may be distinguished from each other and be respectively assigned to multi-step layer input modes 271, 272, and 273 without additional function keys.

In this case, the separation input, the pair input, and the separation pair combining input may be performed in the multi-step layer input modes 271, 272, and 273 based on the middle of the input reference block 124.

In the separation pair combining input, a data different from each other may be inputted according to the order of combination of the separation input and the pair input, or identical data may be inputted regardless of the order of combination. That is, identical characters may be inputted by each of the separation pair combining inputs, that is the pair input after the separation input or the separation input after the pair input.

FIG. 22c is an exemplary view illustrating a multi-step layer input mode in which the English alphabet is assigned and displayed to each of the separated indication positions 110 of the three A-B type separation pairs 150 disposed in the input reference block 124. Here, in the input mode, function commands of one or more side keys 290 may be distinguished from each other and be respectively assigned to the multi-step layer input modes 271, 272, and 273, so that each of the inputs in the input reference block 124 may be smoothly performed.

Referring to FIGS. 19 to 21, or FIG. 23, the input module may be provided so that any one or more inputs among a separation input, a pair input, or a separation pair combining input may be performed by both hands based on the middle of the input reference block 124. Accordingly, a data input capacity is more increased in the input module 100, and users may perform data inputs in a variety of types.

For example, as shown in FIG. 23a, multi-step layer input modes are displayed in such a way that Hangeul consonants, Hangeul vowels, and numbers are respectively assigned to each of the separated indication positions 110 of the three A-B type separation pairs 150 disposed in each of the input reference blocks 124 of two input modules 100 and 100'. Here, as shown in FIG. 23a, in the multi-step layer input modes consisting of a plurality of layer input modes, function commands of one or more function keys 270 and 270' may be distinguished from each other and be respectively assigned to left multi-step layer input modes 271, 272, and 273 and right multi-step layer input modes 274 and 275 without additional function keys.

As shown in FIG. 23b, multi-step layer input modes are displayed in such a way that the English alphabet and various kinds of function keys are respectively assigned to each of the separated indication positions 110 of the three A-B type separation pairs 150 disposed in each of the input reference blocks 124 of the two input modules 100 and 100'. Here, in the multi-step layer input modes, the function commands of one or more side keys 290 may be distinguished from each other and be respectively assigned to the multi-step layer input modes, so that each of the inputs in the two input modules 100 and 100" may be smoothly performed.

Accordingly, there is an advantage in which users can easily and quickly perform a data input through multi-step layer input modes provided in a variety of types, even in case of input characters having more than fifty phonemes such as Chinese characters or Japanese characters.

Figure 18:
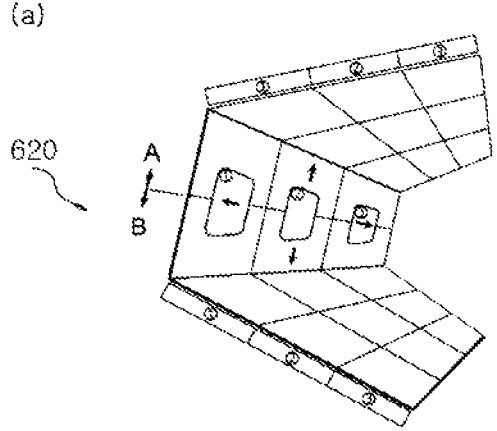
FIG. 18 is an exemplary view illustrating a direction indication data displayed and assigned so as to be recognized based on the middle of the input reference block, in the input modes of various embodiments according to the invention.
Figure 18:
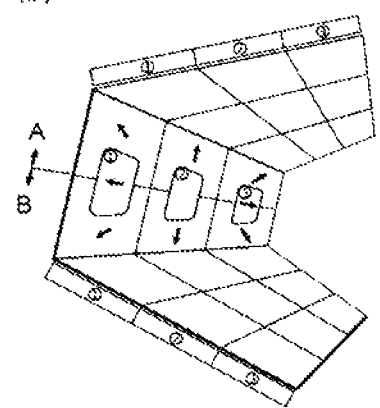
Figure 18:
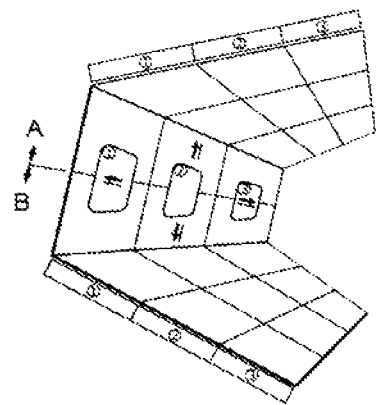
Figure 18:
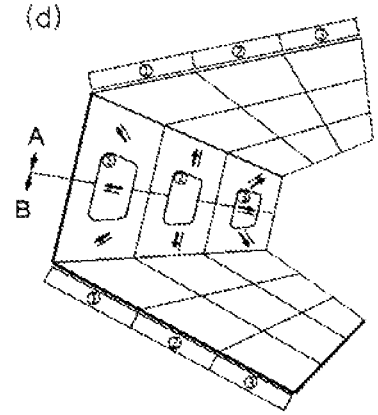

As shown in FIG. 18, in a direction indication input mode, the input module 100 may perform a data input in such a way that any one or more inputs among a separation input, a pair input, or a separation pair combining input is performed in an individual or combined manner based on the middle of an input reference block 124.

For example, as shown in FIG. 18a, each of the direction indication functions is assigned to a left-middle-right type of separation pair which is recognized as a left-middle-right type of A-B selecting position based on the middle of the input reference block 124 in the input module 100, so that input commands of four directional movements may be performed.

In other words, based on the middle of the input reference block 124, the input command of move left ($\leftarrow$) is performed when the left position corresponding to the left separation pair A1-B1 is selected by a pair input, the input command of move forward ($\uparrow$) is performed when the forward middle position corresponding to A2 separated indication position of the middle separation pair A2-B2 is selected by a separation input, the input command of move backward ($\downarrow$) is performed when the backward middle position corresponding to B2 separated indication position of the middle separation pair A2-B2 is selected by a separation input, and the input command of move right ($\rightarrow$) is performed when the right position corresponding to the right separation pair A3-B3 is selected by a pair input.

In addition, when other four directions are further provided to the four directions, movements according to direction indications more than the four directions may be further performed. That is, as shown in FIG. 18b, based on the middle of the input reference block 124, the input command of move forward and left diagonally (↖) is further performed when the forward left position corresponding to A1 separated indication position of the left separation pair A1-B1 is selected by a separation input, the input command of move backward and left diagonally (↙) is further performed when the backward left position corresponding to B1 separated indication position of the left separation pair A1-B1 is selected by a separation input, the input command of move forward and right diagonally (↗) is further performed when the forward right position corresponding to A3 separated indication position of the right separation pair A3-B3 is selected by a separation input, and the input command of move backward and right diagonally (↘) is further performed when the backward right position corresponding to B3 separated indication position of the right separation pair A3-B3 is selected by a separation input.

For another example, in the direction indication input mode, the input module 100 is provided so that the multi-step input of two-times continuous selections can be performed by a separation input or a pair input based on the middle of the input reference block 124, so that a variety of data inputs may be performed.

That is, as shown in FIG. 18c or 18d, the input commands of four directions as shown in FIG. 18a or eight directions as shown in FIG. 18b may be applied to the multi-step input of two-times continuous selections in which the input is performed based on the middle of the input reference block 124.

Here, in the direction indication input mode as shown in FIG. 18c or 18d, when an input of one-time selection may be displayed as a thin arrow in each of the drawings, and a multi-step input of two-time continuous selection may be displayed as a thick arrow in each of the drawings. That during the input of one-time selection (thin arrow), when movement is made to the arrow direction assigned to each of the inputs, the input of one-time selection is converted into the multi-step input of two-times continuous selections (thick arrow), so that a movement speed may be gradually increased or an acceleration and a sudden acceleration may be performed in addition, the direction may be changed by the input of one-time selection in the multi-step input of two-times continuous selections, or by the input of one-time selection and the multi-step input, of two-times continuous selections performed in random order.

Furthermore, in the two or more input modules according to the invention, even when one or more A-B type separation pairs is further disposed outside the input reference block 124 of each of the input modules, each of the input selecting positions of the separation pair disposed outside the input reference block 124 is recognized as each A-B type selecting position of the left or right of the input reference block based on the input reference block 124 in which a finger is positioned, so each of the inputs or a multi-step input of two or more steps may be quickly performed.

Seventh Embodiment

Besides, a data input device 1 using A-B type separation pairs 150 according to the invention may include one or more side keys 290 outside an input module 100 or at a predetermined position of a base 10.

The side keys 290 may be function keys 270 which perform a mode conversion, a menu window conversion, a screen conversion, etc.

Figure 23:
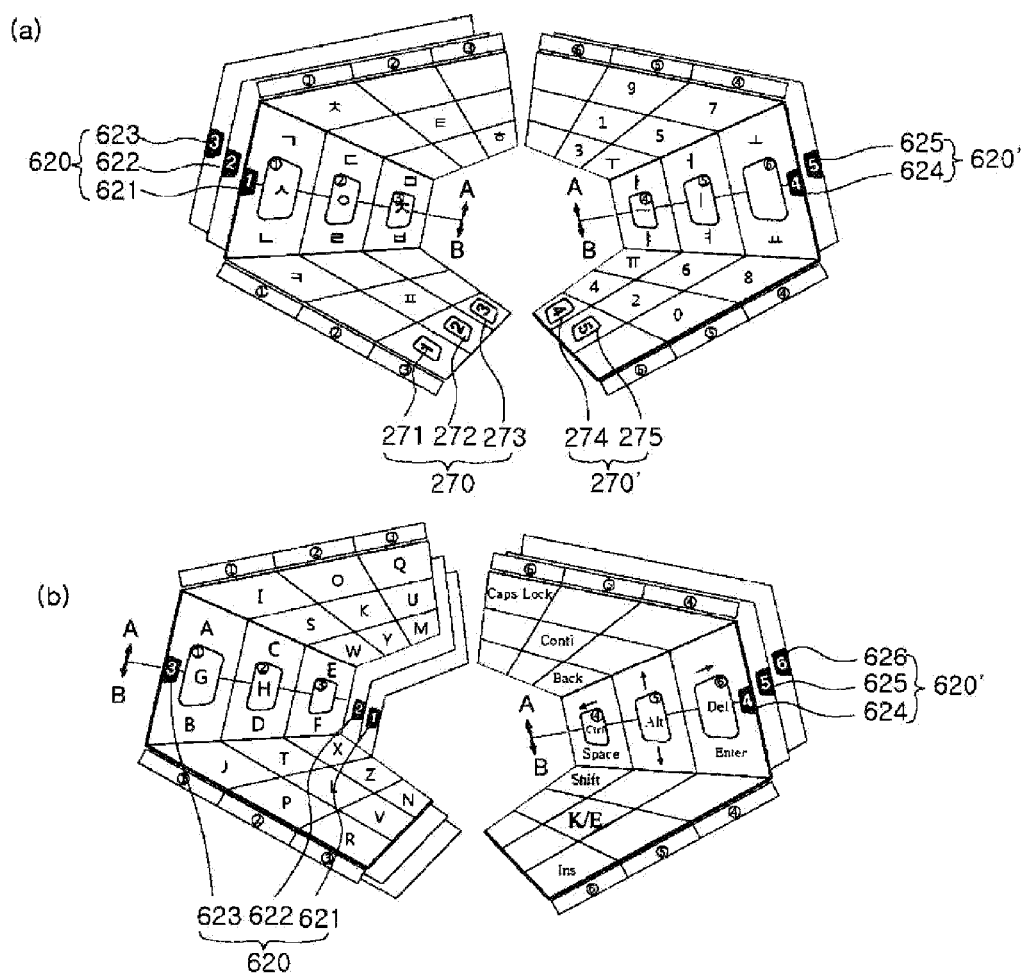
FIG. 23 is an exemplary view for explaining an input performed based on the middle of each of the input reference blocks in a multi-step layer input mode among the input modes of various embodiments, in the two input modules according to the invention.

For example, referring to FIG. 22 or 23, when characters are inputted, a Hangeul input mode is converted into a number input mode and the number input mode is converted into an English alphabet input mode, and an input is performed by means of each function command.

The side keys 290 may be provided as a type of a function keys 270 when the keys are designated at a predetermined position of the base 10 or the input module 100.

The side keys 290 may provide a touch sensor 320 which senses a finger contact.

In case that the side keys provide a touch sensor, when a finger contact is sensed in the touch sensor longer than a predetermined time, a control unit 400 may process a touch input signal as invalid from the signal sensed in the touch sensor.

Referring to FIG. 10, the touch sensor 320 is wholly or partially provided at the upper side of the input module 100 or an input unit 200, and responds to a finger input selection of each separated indication position 110 and then generates an input signal assigned to the input or the corresponding separated indication position. Here, as shown in FIG. 10f, an input contact region 212 may be an input selecting position in which a finger touch is implemented.

Eighth Embodiment

As shown FIGS. 24b to 24c or FIGS. 25b to 25d, two or more input modules according to the invention may be provided at a predetermined position of a base 10. Here, each of the input modules may perform a variety of data inputs including the above-mentioned separation input, pair input, or separation pair combining input.

For example, FIG. 24c is an exemplary view illustrating a tablet type terminal 34 which provides two input modules 100 and 100' at a base 10 so as to perform an input. FIG. 24b is also an exemplary view illustrating a slide type terminal 32 which provides two input modules 100 and 100' at a base 10 so as to perform an input.

In these examples, the two input modules 100 and 100' may be configured so as to perform one or more inputs including the separation input, the pair input, or the separation pair combining input identically with each other or differently from each other.

In other words, in the two input modules 100 and 100', the left input module 100 may be configured so as to perform the separation input, the pair input, or the separation pair combining input and the right input module 100' may be configured so as to perform the separation input, the pair input, the separation pair combining input, or the pair alternating input.

In addition, the two input modules 100 and 100' may be configured so that the number of separated indication positions 110 disposed in separation pairs 120 of each of the input modules is identical with or different from each other, and that a multi-step input by means of two-times continuous selections can be performed in either side or both sides of the two input modules 100 and 100'.

Here, the two input modules 100 and 100' may perform a data input in such a way that, in each input mode, one or more function keys is distinguished into and assigned to multi-step layers, so that a function command of each function key may be performed by means of a multi-step input of two or more steps without additional function keys, or that, in each input mode, different functions are respectively assigned to any one or more inputs among the separation input, the pair input, or the separation pair combining input.

Figure 20:
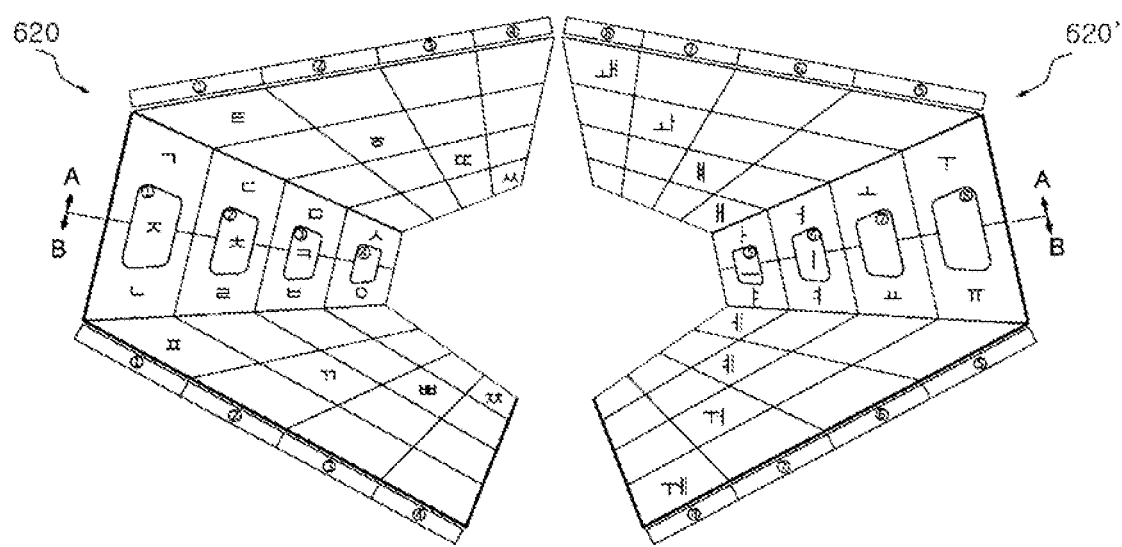
FIG. 20 is an exemplary view illustrating a data of Hangeul input mode displayed and assigned so as to be recognized based on the middle of each of the input reference blocks when one A-B type separation pair is further disposed outside each of the input reference blocks, in the two input modules according to the invention.
Figure 21:
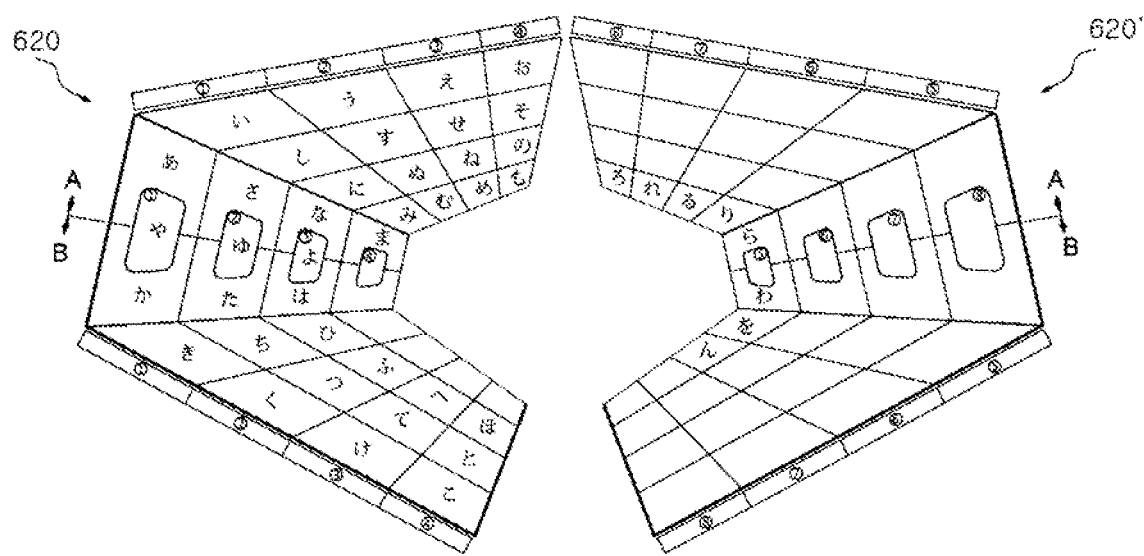
FIG. 21 is an exemplary view illustrating a data of Japanese characters input mode displayed and assigned so as to be recognized based an the middle of each of the input reference blocks when one A-B type separation pair is further disposed outside each of the input reference blocks, in the two input modules according to the invention.

In case of a configuration as shown in FIG. 3c, input reference blocks 124 may be respectively provided in the two input modules 100 and 100' based on a separation reference line 106 passing through each separation reference point 104. In this case, the data assigned to each separated indication position 110 of the three type separation pairs 150 based on the middle of each input reference block 124 may be configured as shown in FIGS. 19 to 21.

Figure 19:
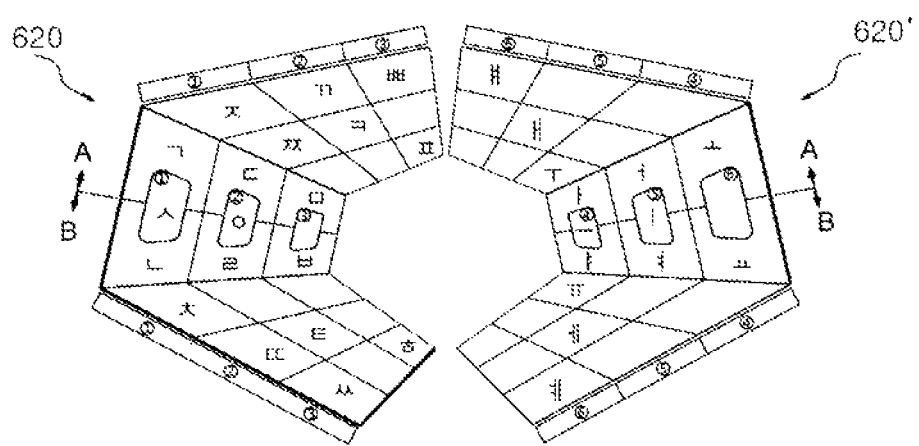
FIG. 19 is an exemplary view illustrating a data of Hangeul input mode displayed and assigned so as to be recognized based on the middle of each input reference block in two input modules according to the invention.

For example, in the two input modules 100 and 100' provided at a predetermined position of the base 10, Hangeul consonants and Hangeul vowels may be respectively assigned and disposed to each separated indication position 110 of the three A-B type separation pairs 150 of the left input module 100 and the right input module 100" based an the separation reference line 106 passing through the separation reference point 104, as shown in FIG. 19.

In the two input modules 100 and 100', other various data except for the data shown in the drawings may be assigned, so that an input is more smoothly performed.

For example, referring to FIG. 19, in the two input modules 100 and 100', functions that are different from each other may be respectively assigned to any one or more inputs among the separation input, the pair input, or the separation pair combining input, so that a data input is performed.

The two input modules 100 and 100' may be configured so that Hangeul character input is performed in the left input module 100, while various kinds of function commands such as Enter, Space, Alt, Del, Ctrl, direction indication, Conti, character conversion, back, Shift, Ins, Caps lock, etc. are performed in the right input module 100'.

Alternatively, the two input modules 100 and 100' may be provided so that a character input and various kinds of function commands are configured and performed together.

Accordingly, user may easily select an additional mode conversion key which converts the function command modes, thereby performing the character input more quickly.

As shown in FIG. 23, when the two input modules 100 and 100' are configured so as to perform each input in multi-step layer input modes, various kinds of function commands are further assigned to the input mode including characters, numbers, direction indication, a special character, a special symbol, etc., so that the data may be inputted.

The two input modules 100 and 100' may be configured so as to include a function for converting to a mouse function mode. When the conversion is made to the mouse function mode, an input including functions of left and right mouse buttons, a scroll function, or a drag function may be performed by means of the separation pair combining input. In addition, when the conversion is made to the mouse function mode, any one of the two input modules may be configured so as to perform a pointer movement, and another one may be configured so as to perform a function for operating pointer. However, the input according to the invention is not limited thereto.

As shown in FIG. 21, in the two input modules 100 and 100', the Japanese character, that is, hiragana may be assigned and disposed to each separated indication positron 110 of the A-B type separation pairs 150 based on the separation reference line 106 passing through the separation reference point 104.

In addition, in the two input modules 100 and 100' according to the invention, even when one or more A-B type separation pairs 150 is further disposed outside each input reference block 124 of the input modules 100 and 100', each of the input selecting positions of the separation pairs disposed outside each of the input reference block 124 is recognized as each A-B type selecting position of the left or right of the input reference block based on the input reference block on which a finger is positioned, so that each of the inputs is quickly performed.

Besides, as shown in FIG. 25d, in the data input device 1 according to the invention, three input modules 100, 100', and 100" may be provided at a predetermined position of the base 10, and the three input modules may be continuously and adjacently disposed.

Hare, each input reference block 124 of the three input modules 100, 100', and 100" is provided in the central region in which each separation reference point 104 of the three input modules 100, 100', and 100' is comprised, and when a finger is put on each input reference block 124, three A-B type separation pairs 150 which are continuously and adjacently arranged may be recognized as one input block type.

The three input modules 100, 100', and 100" may perform the separation input, the pair input, or the separation pair combining input in multi-step layer input modes consisting of a plurality of layer input modes. In addition, in the multi step layer input modes, function commands of one or more function keys may be distinguished from each other and assigned to each of the layer input modes without an additional function key.

Furthermore, as shown in FIGS. 4 to 7, or FIG. 9, in each input reference block 124 of the input modules 100, 100', and 100", the input selecting position corresponding to each of the separated indication positions 110 of the separation pairs 150 is recognized as a left-middle-right type, a left middle-middle-right middle type, a forward and backward left-forward and backward middle-forward and backward right type, or a forward and backward left middle-forward and backward middle-forward and backward right middle type of A-B type selecting position based on the middle of each input reference block 124, so that the data input may be individually or continuously performed in an easy and quick manner by a short moving line of a finger and a familiar input operation according to the position recognition.

Ninth Embodiment

In a data input device 1 using A-B type separation pairs 150 according to the invention, a predetermined character is assigned to each separated indication position 110 of the separation pairs 150, so that a corresponding input may be performed.

Here, the character is one of data inputted to the input device according to the invention, includes Hangeul, English, Japanese, Chinese, at and represents any characters used in countries of the world.

In addition, the data according to invention represent information or materials such as numbers, characters, symbols, a special symbol, sound, pictures, images, etc. which can be inputted or outputted in electronic devices or in interfaces of the electronic devices.

Figure 17:
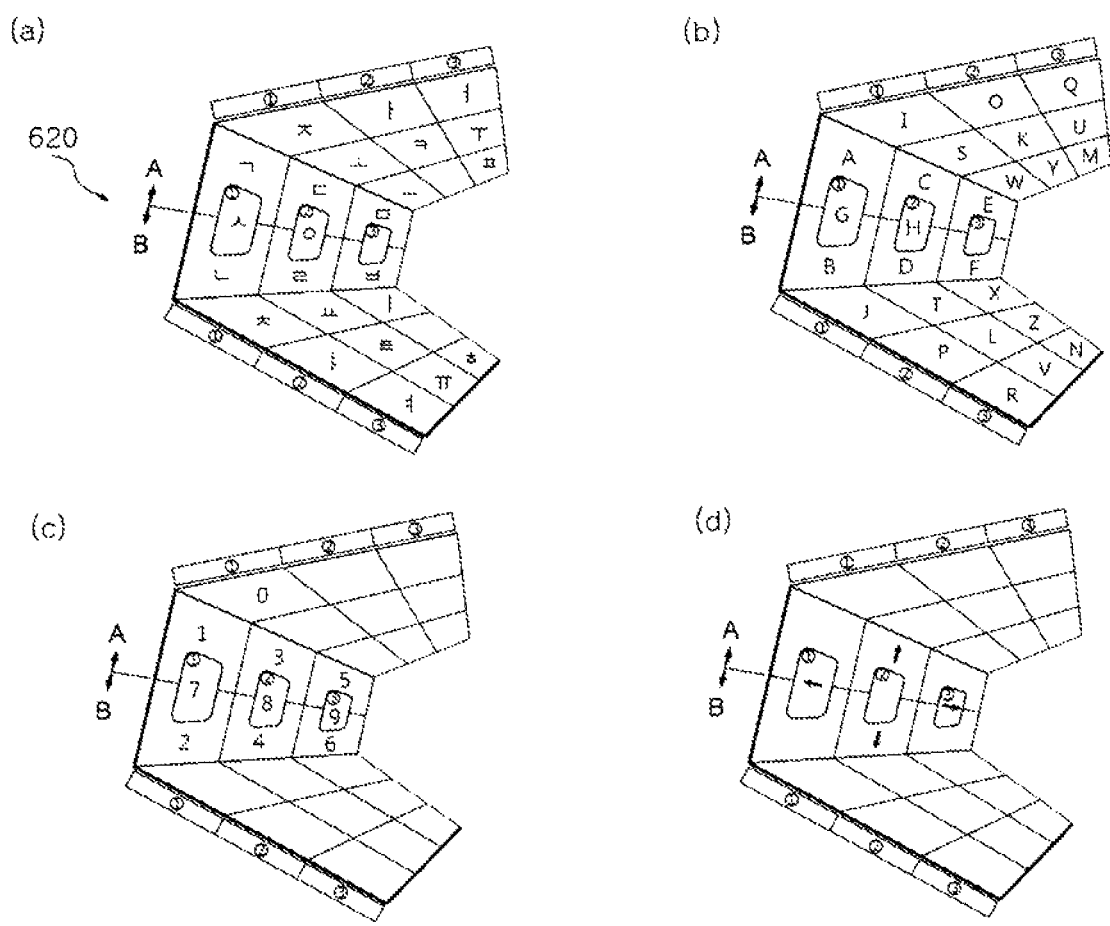
FIG. 17 is an exemplary view illustrating a data displayed and assigned so as to be recognized based on the middle of the input reference block, in the input modes of various embodiments according to the invention.

FIG. 17a is an exemplary view illustrating Hangeul assigned and disposed to each separated indication position 110 of an input reference block 124 in which three A-B type separation pairs 150 are continuously and adjacently arranged as a left-middle-right type around a separation reference point 104, in an input module 100 according to the invention.

As shown in FIG. 17a, an input operation of " 앗 " will be described as an example of an input of Hangeul characters.

In a state in which each of the input selecting positions is recognized as the position of a left-middle-right A-B type based on the middle of the input reference block 124 as soon as a finger is put on the input reference block 124 of the input module 100, " ㅅ " is inputted by the pair input selecting the A1-B1 separated indication position when the position corresponding to the left separation pair (①) is selected, " ㅐ " is inputted by the separation pair combining input sequentially combining the separation input which selects the A1 separated indication position and the pair input which selects the A2-B2 separated indication position when the position corresponding to the forward left of the left separation pair and the position corresponding to the middle separation pair (②) are sequentially inputted, " ㅁ " is inputted by the separation input selecting the B2 separated indication position when the position corresponding to the backward middle of the middle separation pair is selected, and " ㄱ " is inputted by the separation input selecting the A3 separated indication position when the position corresponding to the forward right of the right separation pair is selected, so that the character " 생 " is inputted.

In the input module 100 according to the invention, a variety of data are designated by means of any one or more inputs among the above-mentioned separation input, pair input, separation pair combining input, and pair alternating input, so that the input may be performed.

As shown in FIG. 17c, ten numbers may be assigned to each input and be disposed as the A-B type separation pairs based on the middle of the input reference block 124. That is, the numbers are disposed in such a way that "1" and "2", "3" and "4", and "5" and "6" are respectively assigned to the forward and backward left positions, the forward and backward middle positions, and the forward and backward right positions so as to be selected by the separation input, "7", "8", and "9" are respectively assigned to the left position, the middle position, and the right position so as to be selected by the pair input, and "0" is assigned and disposed to the forward left position and the left position so as to be selected by the separation pair combining input.

As shown in FIG. 17d, a function for indicating four directions may be assigned to each of the inputs and disposed as an A-B type separation pair based on the middle of the input reference block 124. That is, direction indication symbols such as "↑" and "↓" are respectively assigned to the forward and backward middle positions, so as to be selected by the separation input, and direction indication symbols such as "←" and "→" are respectively assigned to the left position and the right position so as to be selected by the pair input.

The input module 100 according to the invention may further include one or more A-B type separation pairs 150 outside the input reference block based on the input reference block 124, so that the number of data inputs may be increased.

FIG. 17b is an exemplary view illustrating the English alphabet assigned and disposed to each separated indication position 110 of the input, reference block 124 in which the three A-B type separation pairs 150 are continuously and adjacently arranged as a left-middle-right type around the separation reference point 104 which is a reference point of the input module 100, in the input module 100 using the A-B type separation pairs 150 according to the invention.

As shown in FIG. 17b, an input operation of "game" will be described as an example of the input of English alphabet characters.

In a state in which each of the input selecting positions is recognized as the position of a left-middle-right A-B type based on the middle of the input reference block 124 as soon as a finger is put on the input reference block 124 of the input module 100, "g" is inputted by the pair input selecting an A1-B1 separated indication position when the position corresponding to the left separation pair (①) is selected, "a" is inputted by the separation input selecting the A1 separated indication position when the position corresponding to the forward left of the left separation pair is selected, "m" is inputted by the separation pair combining input sequentially combining the separation input which selects the A3 separated indication position and the pair input which selects the A3-B3 separated indication position when the position corresponding to the forward right of the right separation pair and the right separation pair (③) are sequentially inputted, and "e" is inputted by the separation input selecting the A3 separated indication position when the position corresponding to the forward right of the right separation pair is selected, so that the character "game" is inputted.

In addition, in the input module 100 according to the invention, even when one or more A-B type separation pairs is further disposed outside the input reference block 124, the input selecting position of each separated indication position of the separation pairs disposed outside the input reference block 124 is recognized as each A-B type selecting position of the left or right of the input reference block based on the input reference block 124 on which a finger is positioned, so that the character input may be quickly performed.

Besides, the input module 100 according to the invention may be provided so that any one or more among characters, numbers, symbols, Enter, a mode conversion, or each function command are performed by the separation input or the pair input. Here, each of the inputs may be designated so as to perform a dialing/hang up function when a call mode is operated.

For example, the input module 100 may perform a mouse function at the three A-B type separation pairs 150 disposed based on the middle of the input reference block 124 through each of the inputs.

In this case, in the mouse function mode, a pointer may be moved by the separation input or the pair input.

That is, referring to FIG. 17d or 18a, in a state in which each of the input selecting positions is recognized as the position of a left-middle-right A-B type based on the middle of the input reference block 124 as soon as a finger is put on the input reference block 124, the pointer moves forward by the separation input selecting the A2 separated indication position when the forward middle position is selected, the pointer moves backward by the separation input selecting the B2 separated indication position when the backward middle position is selected, the pointer moves left by the pair input selecting the A1-B1 separated indication position when the left position is selected, and the pointer moves right by the pair input selecting the A3-B3 separated indication position when the right position is selected.

In addition, the functions of left and right mouse buttons and the scroll function may be performed in the mouse function mode by the separation pair combining input.

That is, based on the middle of the input reference block 124, the function of left mouse button may be performed by a selection of the left separation pair A1-B1 and the function of right mouse button may be performed by a selection of the right separation pair A3-B3, or the scroll function may be performed by a selections of the middle separation pair A2-B2, and the forward middle position (A2 separated indication position) or the backward middle position (B2 separated indication position).

In this case, based on the middle of the input reference block 124, when any one separation pair 150 among the left, middle, and right separation pairs of the input reference block is selected, and then any one separated indication position 110 among the forward left, backward left, forward middle, backward middle, forward right, and backward right separated indication positions is continuously selected, a mouse drag function may be performed toward the corresponding position.

Besides, when a multi-step input of two-or-more-times continuous selections is performed during any one or more inputs among the above-mentioned separation input, pair input, and separation pair combining input based on the middle of the input reference block 124, the input module 100 according to the invention may control speed step-by-step, or perform an acceleration or deceleration function while the mouse pointer is moved or the scroll function is performed.

For example, in a state in which any one or more inputs among the separation input, pair input, and separation pair combining input are performed based on the middle of the input reference block 124, any one among input modes of Hangeul, number, English alphabet, hiragana, mouse function, symbol, and special characters displayed in a mode menu window 660 is selected, so that the input may be performed.

Here, in a data display segment 620 of the input module 100, a data assigned to each of the separated indication positions 110 may be processed so as to be invisible and various kinds of the input modes displayed in the menu window may be visible, or additional menu windows which are apart from the data assigned to each of the separated indication positions 110 may be respectively displayed.

In addition, in the data display segment, the assigned data and the mode menu window may be alternately displayed in a whole or partial by a semitransparent manner for a predetermined time, or be wholly or partially displayed by a semitransparent manner according to a user selection.

The input module 100 according to the invention includes a function for converting to a joystick function mode, wherein when any one or more inputs among the separation input, pair input, and separation pair combining input based on the middle of the input reference block 124 is converted into a joystick input mode and then is performed, any one or more functions among a move of a game character or an avatar, an ascent or descent to a designated direction while in motion of the game character or the avatar, or a rotation or jump at a designated position while in motion of the game character or the avatar may be individually or combinedly performed.

Furthermore, in the input module 100, when any one or more inputs among the separation input, pair input, and separation pair combining input based on the middle of the input reference block 124 is performed in a document mode, any one or more functions among move a document menu window, drag a document menu window, move and search a document menu window, enlarge and shrink a document menu window, drag a designated file or folder, copy a whole or partial file content, pull a whole or partial file content, move a graphic, object, enlarge or shrink a graphic object, tilt a graphic object, or rotate a graphic object in a designated position may be individually or combinedly performed.

In electronic devices or portable terminals to which the input module 100 according to the invention is applied, a mouse function menu window and a basic input menu window may be respectively displayed at a predetermined position of the base 10 or the display unit 600 of the terminals when the devices or terminals are powered on.

Here, the menu window may be provided so as to move to various kinds of menu windows in which a character input or a number input is included.

In this case, in the menu window 660, the mouse function menu window may be displayed in a fixed manner, or the input mode menu window may be displayed according to finger contact.

In addition, in the menu window, the basic input menu window may be repeatedly displayed for a predetermined time, or various kinds of input menu window may return to the basic input menu window according to a finger contact or a designated signal.

Although any one or more windows among the menu windows may be provided so as to call the mouse function menu window, to be called to a randomly-designated input menu window, or to return to the basic input menu window using a side key 290 of the electronic devices or portable terminals, so that a data input is performed, and the input according to the invention is not limited thereto.

Besides, an input module 100 or an input unit 200 according to the invention includes a separation sensing unit 300 which senses an input generated by an individual or continuous selection to one or more separated indication positions 110 disposed in two sides, that is, an A separated segment 130 and a B separated segment 140 which are ambilaterally divided from a separation reference line based en the separation reference line 106 passing through a separation reference point 104.

In this case, the separation sensing unit 300 may be provided in a variety of types so as to correspond to each input type, which includes a separation input, a pair input, or a separation pair combining input, within a contact area of a finger 102.

For example, referring to FIG. 10, the separation sensing unit, may be provided as a pressure sensor which senses an input by an input selection, or as a contact sensor which senses contact at a predetermined position between a base 10 and the input module 100.

In addition, the separation sensing unit may be provided so as to respond to a sequential input selection, so that signals of two or more steps are distinguished from each other and generated step-by-step. Here, the separation sensing unit may be provided so as to respond step-by-step, to a strength difference between applied pressures by an input selection.

Furthermore, when an input by an input selection is performed in an input contact region 212 provided at the upper side of an input module 100 or an input unit 200, as shown in FIG. 7, or another input by an input selection is performed at an input selecting segment 220 provided to the input module 100 or the input unit 200, as shown in FIGS. 26a to 26e, a pressure sensor, a contact sensor, or a touch pad provided at a lower side of the input contact region or the input unit 200 may be configured as the separation sensing unit.

Here, the separation sensing unit 300 may be an elastic member 240 which returns using elasticity after making contact with a sensing sensor by means of applied pressure between the base 10 and the input module 100 or the input unit 200, or a conductive elastic member 240 which is repeatedly pressed and returns for itself. In this case, the elastic member may be provided in a material which is wholly or partially deformable by a predetermined elasticity coefficient so as to respond to pressure in a vertical direction as well as in a diagonal direction according to the input selection.

In addition, the separation sensing unit may be provided as a touch pad or a touch screen which senses contact by an input selection of a finger. Here, the touch screen may include a tactile sensor.

Furthermore, the separation sensing unit may be configured in a variety of types so as to sense whole or partial displacement of a finger.

The A and B separated segments in the input module 100 or the input unit 200 may further provide various kinds of separation sensing units in which a number of sensing sensors are further provided to each separated indication position corresponding to each input selecting position or the input selecting segment 220, or to a peripheral region of each separated indication position, besides, the separation sensing unit may be provided in a variety of types within a contact area of a finger 102, or be configured so as to be deformable.

For example, referring to FIG. 10e, a number of sensing sensors 341 and 342 are disposed in an A separation sensing unit 340 making contact with an A separated indication position 132 and a number of sensing sensors 351 and 352 are also disposed in a B separation sensing unit 350 making contact with a B separated indication position 142, so that an input signal by a contact of each input selection is generated.

Besides, in a data input device 1 using A-B type separation pairs 150 according to the invention, an input module 100 or an input unit 200 may be provided in various shapes.

FIGS. 26a to 26h are exemplary views illustrating various types of the input modules 100 or the input units 200.

Here, the input module 100 or the input unit 200 may be provided so that displacement of a finger or an input operation of a finger is easily made in a contact state of the finger. In addition, although the input module 100 or the input unit 200 may be formed in any one type among a flat panel shape, a polygon, an oval, a hemisphere shape, a whole circle, or a partial circle, or in a combining type of the one or more shapes among the above-mentioned shapes, the input module 100 or the input unit 200 according to the invention is not limited thereto.

For example, as shown in FIG. 26a, the input module 100 or the input unit 200 may be provided in a type including a flat panel, and each of the forms may further include a separating groove, a separating line, a separated protuberance, a protruding frame, etc.

That is, as shown in FIG. 26b, the input module 100 or the input unit 200 may be provided in a type having the separating groove 230.

Also, as shown in FIG. 26c, the input module 100 or the input unit 200 may be provided in a type having the separating line 232.

In addition, as shown in FIG. 26d, the input module 100 or the input unit 200 may be provided in a type having the separated protuberance 234.

Furthermore, as shown in FIG. 26e, the input module 100 or the input unit 200 may be provided in a type having the protruding frame 236.

Still furthermore, as shown in FIG. 26g, the input module 100 or the input unit 200 may be provided in a type having a concave segment 280.

Still furthermore, as shown in FIG. 26h, the input module 100 or the input unit 200 may be provided in an asymmetric concave stereoscopic form including an asymmetric concave segment 282. However, the input module 100 or an input surface 210 according to the invention is not limited thereto.

Also, a variety of shapes of the input module 100 or the input unit 200 prevent a finger from slipping when an input selection or an input operation is made, or enables users to hold or operate the data input device more smoothly.

Besides, an input module 100 or an input unit 200 according to the invention may be provided in a variety of materials including an elastic or inelastic body.

Figure 27:
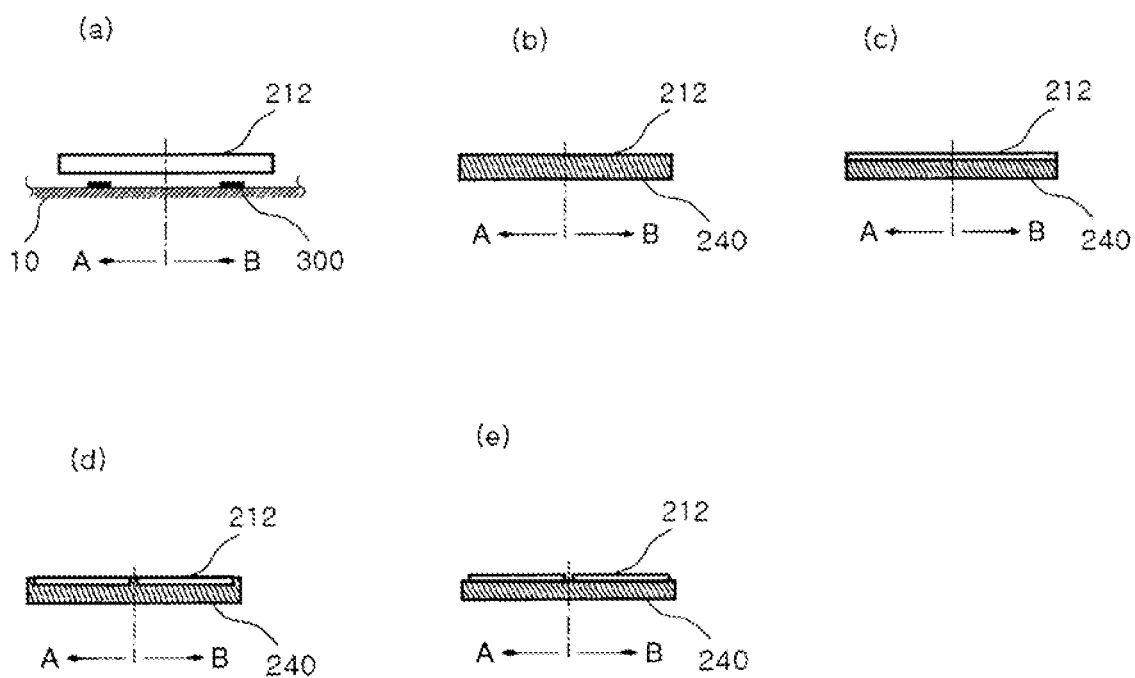
FIG. 27 is an exemplary view for explaining the input module or the input unit provided as various forms according to the invention.

For example, FIG. 27a is a cross-sectional view illustrating a case in which the input module 100 or the input unit 200 is provided in an inelastic material.

For another example, FIGS. 27b to 27e are cross-sectional views illustrating various types of cases in which various forms of the input modules 100 or the input units 200 are provided in an elastic material.

For example, as shown in FIG. 27b, the input module 100 or the input unit 200 may be provided in a flat panel form of the elastic member 240 when being made of an elastic material.

Also, as shown in FIG. 27c, the input module 100 or the input unit 200 may be provided in an upper input surface 210 and a panel type of lower elastic member 240 when the input surface and a lower side corresponding to the input surface are formed of an elastic material.

In addition, as shown in FIG. 27d, the input module 100 or the input unit 200 may be provided in the upper input surface 210 and a panel type of the lower elastic member 240 when the input surface and the lower corresponding to the input surface are formed of an elastic material. Here, the input surface 210 may be ambilaterally divided into two sides based on the middle of an input reference block 124, and be formed in a concavely-inserted shape on the upper side of the elastic member.

Furthermore, as shown in FIG. 27e, the input module 100 or the input unit 200 may be provided in the upper input surface 210 and a panel type of the lower elastic member 240 when the input surface and a lower corresponding to the input surface are formed of an elastic material. Here, the input surface 210 may be ambilaterally divided into two sides based on the middle of the input reference block 124, and be formed in a convexly-protruded shape on the upper side of the elastic member.

Besides, referring to FIG. 2, 24, 25, or 28, a base 10 of an input device according to the invention may provide one or more display units.

Here, in case that the display unit is provided in one side of the base 10, a control unit 400 may extract an input command of a data corresponding to an input signal which is judged from a signal sensed when each input is made, and then process an input so that the input command is displayed on the display unit.

In this case, the display unit forming an input mode to input a data may further include one or more data display segments 620 in which data assigned to each separated indication position 110 of an input module 100 is displayed, and a corresponding input content is displayed according to an input selection or an input operation of a user or an assigned data in the selected input mode is displayed.

Here, referring to FIGS. 17 to 23, the data display segment may display a variety of data including characters, numbers, symbols, or various function keys 270 which are respectively assigned to the separated indication positions 110.

Figure 24:
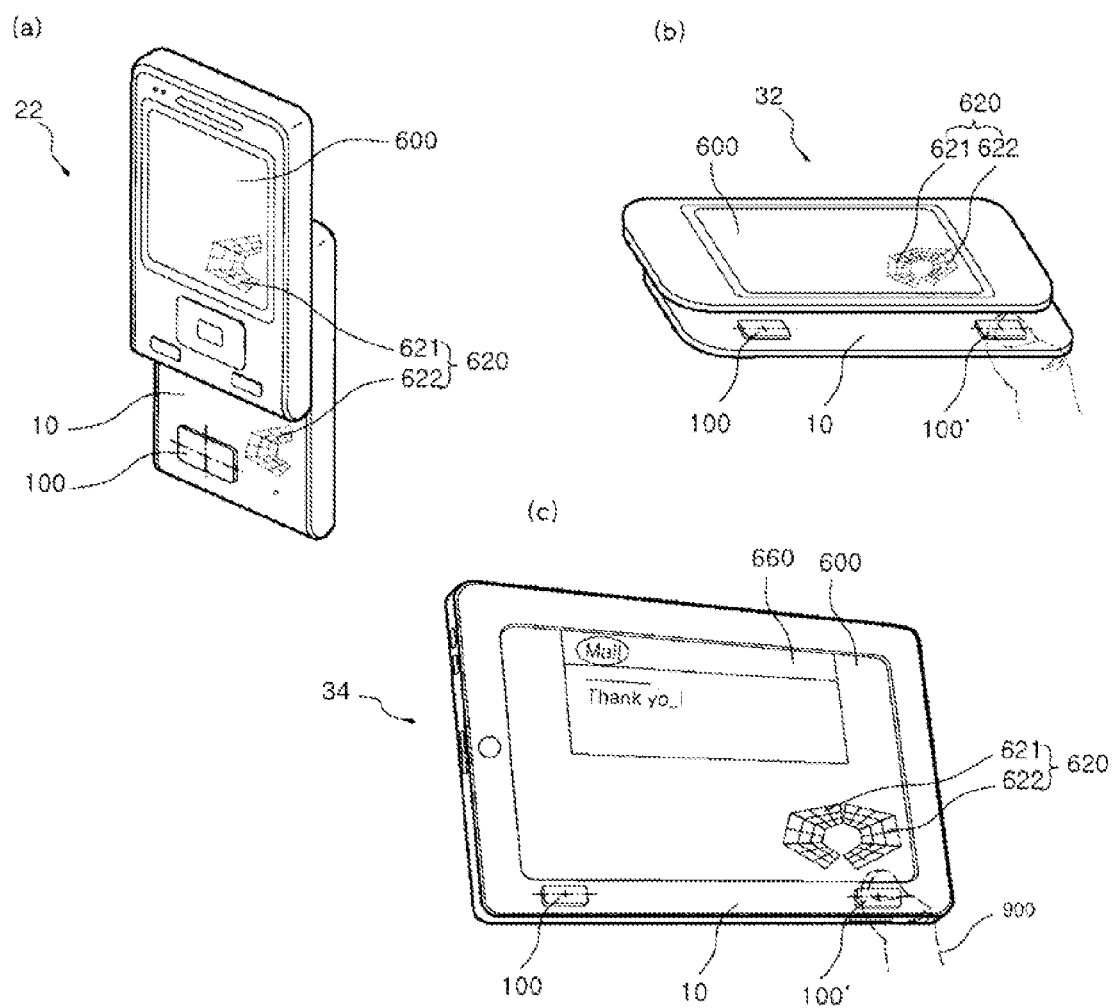
FIG. 24 is an exemplary illustrating a data display segment according to the invention displayed on electronic devices or portable terminals in a variety of forms.
Figure 25:
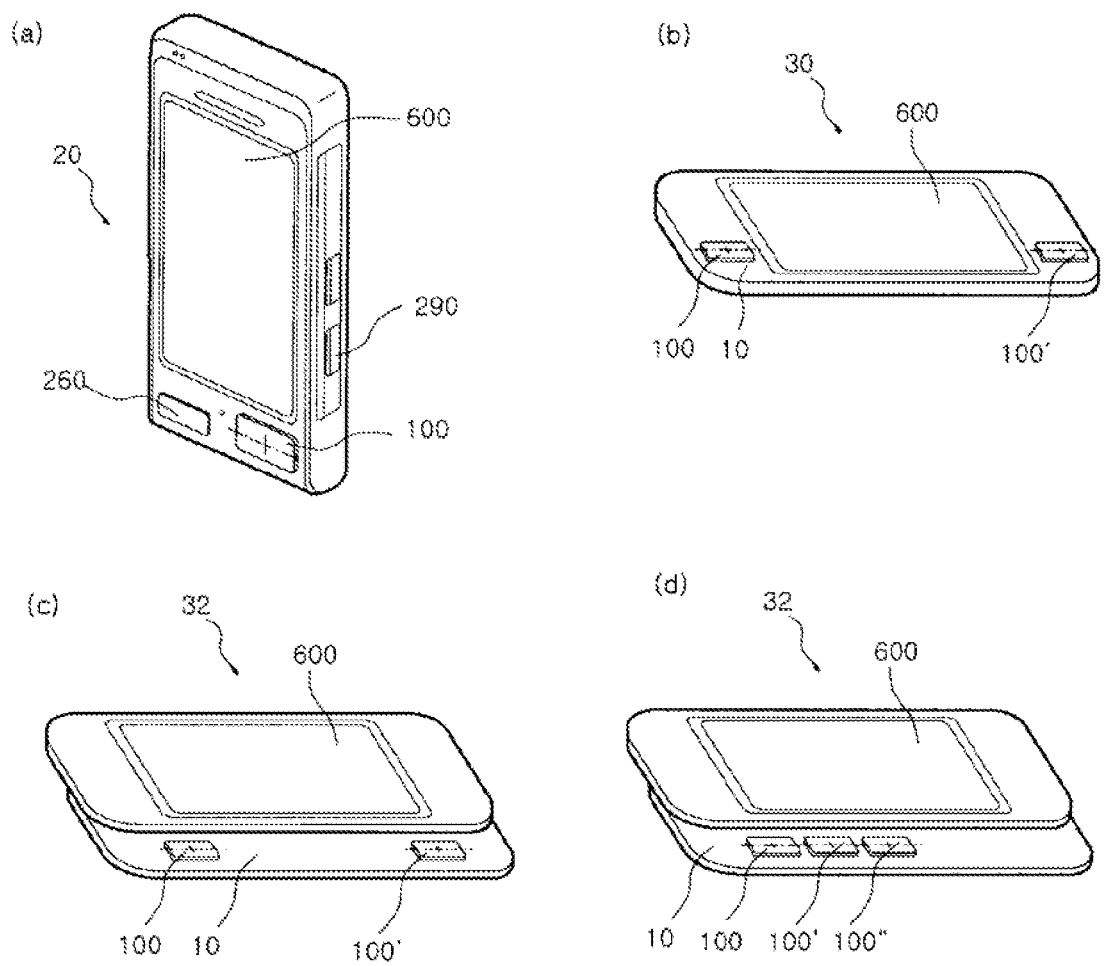
FIG. 25 is a perspective view illustrating various forms of electronic devices or portable terminals to which the data input device according to the invention is applied.

In addition, the data display segment may be displayed as various kinds of input menu windows when an input mode is performed. Here, as shown in FIG. 24, the one or more data display segments may be provided so as to display assigned data. For example, as shown in FIG. 24a, the two data display segments 620 may be respectively provided and displayed in the display unit as a first data display segment 621, and at the base 10 near the input module 100 as a second data display segment 622.

Referring to FIGS. 18c to 18d, FIG. 22, or FIG. 23, a data display segment 620 may be distinguished from each other by each layer and be displayed, in multi-step layer input modes consisting of a plurality of layer input modes. For example, referring to FIG. 23b, when the six data display segments 620 and 620' are displayed as the multi-step layer input modes, a first data display segment 621, a second data display segment 622, a third data display segment 623, a fourth data display segment 624, a fifth data display segment 625, and a sixth data display segment 626 are distinguished from each other by each layer and respectively displayed in a first layer input mode, a second layer input mode, a third layer input mode, a fourth layer input mode, a fifth layer input mode, and a sixth layer input mode.

The data display segment 620 may be outputted as one or more menu windows 660. In other words, referring to FIG. 23b, the data display segments 620 and 620' outputted as six steps may be six menu windows, and the menu windows may be displayed in a form of a multi-step layer input mode of the data display segment.

For example, when the menu window is outputted in a form of the multi-step layer input mode, the data assigned characters, numbers, and symbols are distinguished from each other by layer and respectively displayed in the first layer menu window 621, the second layer menu window 622, and the third layer menu window 623.

In addition, in the third layer menu window 623, the menu windows being used may be displayed on a screen, and other menu windows may be wholly or partially displayed in a semitransparent manner.

Referring to FIG. 23, when two input modules 100 and 100' are provided to a predetermined position of the base 10, the menu window outputted as a plurality of layers may be configured in various forms of input modes. For example, the input modules 100 and 100' may be configured so that functions of a menu window in the one input module and a menu window in the other input module are connected with each other, and thus, a data in an identical input mode may be displayed in a divided manner, or Hangeul and the English alphabet are distinguished from each other and respectively displayed on the one menu window and the other menu window. Here, a method for inputting each character in the above-mentioned character input may be applied so as to operate each of the menu windows.

In addition, the data display segment 620 may be displayed in the display unit or at a designated position of the input module 100 or the input unit 200, or be displayed based on a position in which a contact signal is generated by a finger contact at the time of input selection. Here, a separation sensing unit 300 corresponding to the input selection may be provided as a touch pad or a touch screen sensing a finger contact.

Accordingly, in the input module or the input unit, when the menu window is outputted in a form of a plurality of layers, the menu window may be configured in various forms of input modes.

In an input module 100 or an input unit 200 according to the invention, an input is performed by a finger, or a variety of input means including a pen or a stylus may be used.

Besides, an input module 100 according to the invention may be applied to electronic devices or interfaces of electronic devices as a variety of forms.

Figure 2A:
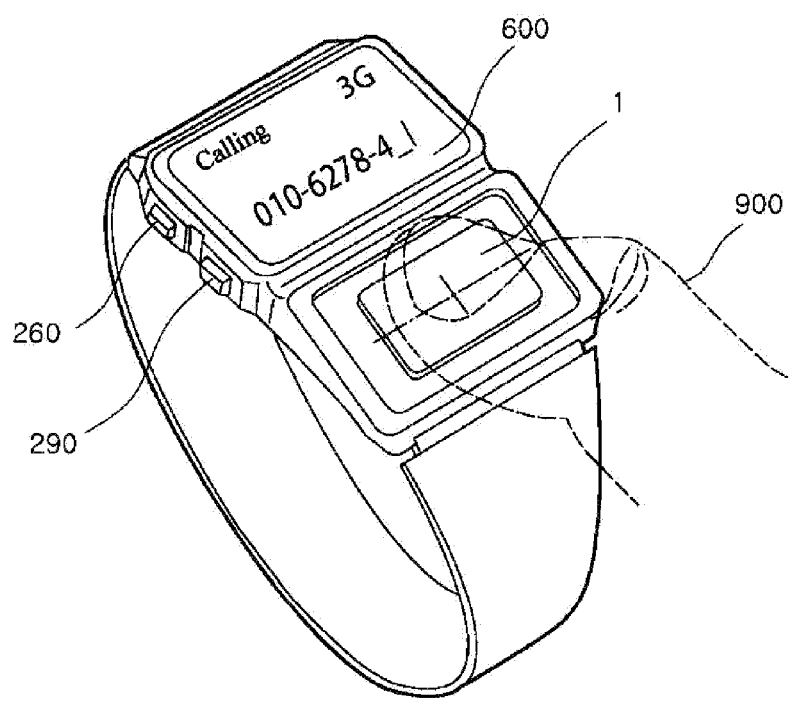
FIG. 2 is a perspective view illustrating a portable terminal to which a data input device according to the invention is applied.

For example, the input module may be applied to a configuration of an all-in-one type terminal 20 as shown in FIG. 25a or 30 as shown in FIG. 25b, a slide type terminal 22 as shown in FIG. 24a or 32 as shown in FIG. 24b and FIGS. 25c to 25d, a detachable type terminal as shown in FIG. 2., etc. In addition, two input modules 100 and 100' may be provided as shown in FIGS. 24b to 24c, FIGS. 25b to 25c, FIGS. 28a to 201D, etc., or three input modules 100, 100', and 100" may be provided as shown in FIG. 25d. These input modules may be applied to portable terminals as well as fixed type electronic devices or interfaces of electronic devices in a variety of forms.

Here, the input module may include an input unit 200 in which any one or more inputs among a separation input, a pair input, or a separation pair combining input is individually or continuously performed and a separation sensing unit 300 which senses each input of the input unit.

Besides, referring to FIG. 25f, an input module 100 or an input unit 200 may further include a support 250 penetrating a separation reference point 104. Here, the support may be provided in a form which is protruded outward or dented inward in the input module 100 or the input unit 200.

In this case, the support 250 may be provided in an elastic member 240, and include a predetermined elasticity coefficient so that an input operation or displacement of a finger is smoothly performed when an input is made. Here, the support may perform a return function which enables the input module 100 or the input unit 200 to return to an original state after the input is performed.

In addition, when the elastic member 240 may be provided in a conductive material, the support 250 may generate a designated signal by an input selection.

Figure 28:
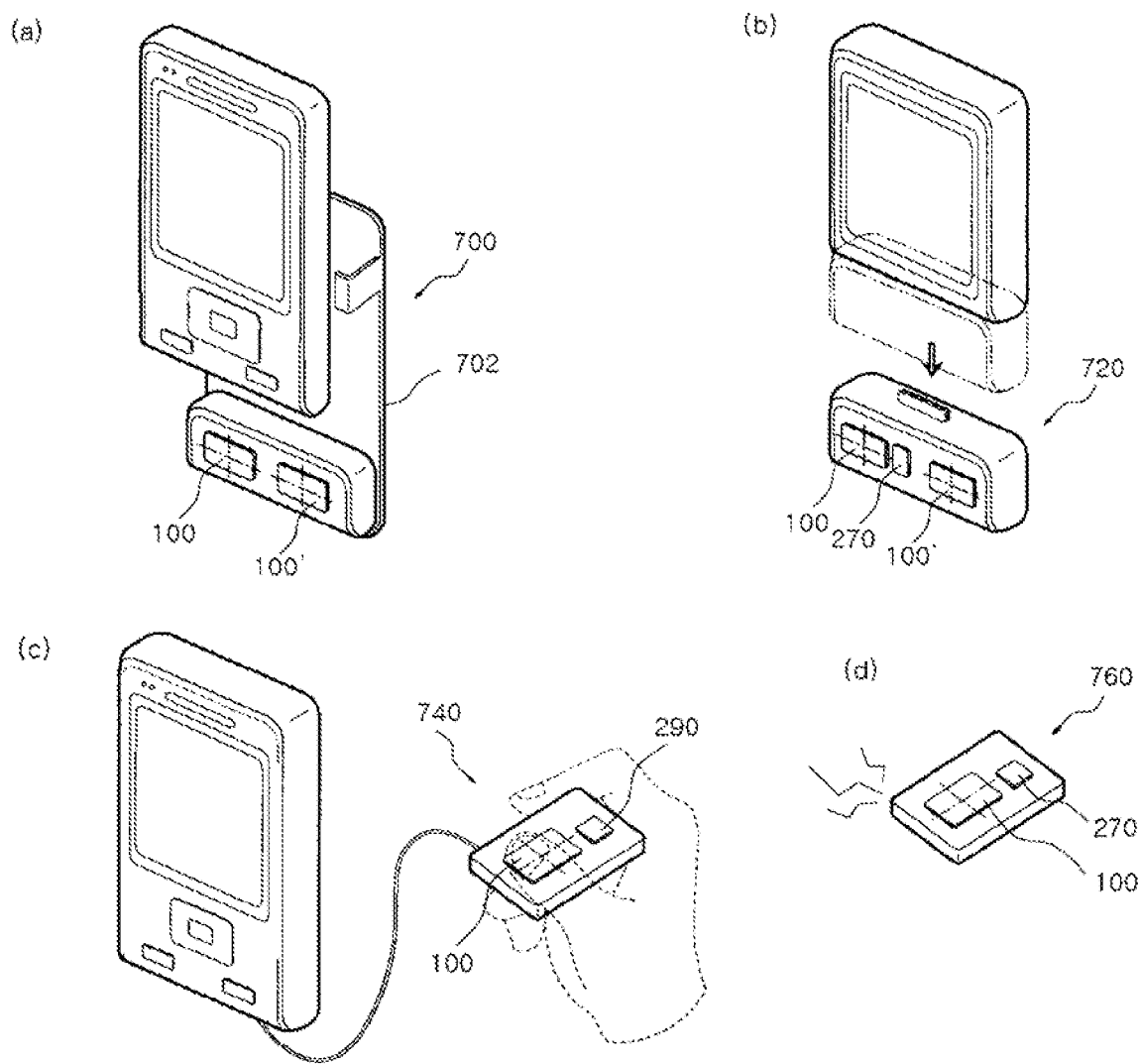
FIG. 28 is an exemplary view illustrating the input module or the input unit provided to electronic devices or portable terminals in various types of interfaces according to the invention.

In each of the terminals, as shown in FIG. 28, a predetermined function key 270 may be provided to one side of a base 10. Here, the function key may be provided so as to easily input, a variety of input commands, or a mode conversion such as an input conversion, a menu window conversion, screen conversion, etc.

As described above, although preferred embodiments of the invention have been described through the detailed disclosure of the invention, it will be apparent to those skilled in the art that various modifications and applications may be made without departing from the scope of the invention. Therefore, the scope of the invention is not limited to the above-described embodiments, but is defined by the appended claims and their equivalents.

Industrial Applicability

The invention relates to a data input device and method, wherein the data input device according to the invention provides an input module consisting of a number of separation pairs, and the input module includes a number of A separated indication positions and a number of B separated indication positions which are disposed as each A-B type based on a predetermined separation reference line, in two sides, that is, an A separated segment and a B separated segment which are ambilaterally divided based on the separation reference line, so that a data input is individually or continuously performed by means of an input selection to the one or more separated indication positions, and thus, the invention may be applicable to electronic devices or portable terminals.

The invention claimed is:

1. Data input device comprising:
at least one input module which is used to allow data to be inputted and provided to a base;
a memory which stores data assigned to a signal of an input made in the input module; and
a controller which extracts the data assigned to the input from the memory when the input signal is made in the input module and then allows the extracted data to be inputted,
characterized in that the input module is provided to comprise an input reference block within a selection area formed by one finger, wherein the input reference block is formed in such a manner that three A separated indication positions and three other B separated indication positions in A and B sides, which are separated from each other from a separation reference line, are arranged to face each other as only three A-B type separation pairs that are spaced from each other along the separation reference line, thereby being disposed in a rectangular form, on the input reference block, the three A-B type separation pairs are disposed within a contact area of a fingerprint region on a distal end of one thumb, that is, when the one thumb is placed on the input reference block, selection positions of the three A-B type separation pairs are recognized as left, central, and right positions of the fingerprint region on the distal end of the one thumb as well as a front and a rear of each of the left, central, and right positions, on the input reference block, a selection is made by a single input click performed with one finger, wherein one of the A and B separated indication positions in the A and B sides is individually selected by the single input click, and thus one data assigned to one input signal generated through the individual selection is inputted, or the separation reference line disposed between the A and B separated indication positions forming one A-B type separation pair is selected by the single input click, and thus one data assigned to two input signals generated through the selection of the A and B separated indication positions is inputted, wherein each of the single input clicks is made in a downward direction, and wherein the two input signals made on the input reference block through the selection is processed as one pair input, and when A and B separated indication positions selected together to make the pair input fail to come into contact with a predetermined sensor simultaneously, two signals corresponding to the A and B separated indication positions are sequentially generated and the controller determines the two signals as the pair input, based on a pre-set time value.

2. Data input device according to claim 1, wherein the input module comprises a separation sensing unit which senses the input and generates an input signal corresponding to the input.

3. Data input device according to claim 1, wherein the input module comprises an inputtable panel which is formed so that each of the separated indication positions forming the separation pairs is selected at the time of the input, and is provided as a detachable type.

4. Data input device according to claim 1, wherein, in the input module, at least one A-B type separation pair is further arranged to the left or right of the input reference block along the separation reference line, and the selection position of the further A-B type separation pair is recognized as a position to the left or right of the input reference block as well as the front and the rear of the position to the left or right of the input reference block.

5. Data input device according to claim 1, wherein the input module is provided so that two or more continuous signals are generated according to a difference between applied pressures at the time of the input.

6. Data input device according to claim 1, wherein the one input signal made on the input reference block through the selection is processed as one separation input, the selection allows the separation and the pair input to be sequentially performed, and the controller determines input signals sequentially made through the separation input and the pair input, and then allows data corresponding to the determined input signals to be inputted.

7. Data input device according to claim 6, wherein, when one input signal corresponding to the separation input and other two input signals corresponding to the pair input are made together, the controller allows data assigned to the separation input after the pair input or another data assigned to the pair input after the separation input to be inputted, based on a generation order of the one input signal and the other two inputs signals.

8. Data input device according to claim 1, wherein the input module further comprises one or more input selecting segment which is formed at an upper portion of the input module so that the positions corresponding to the corresponding separated indication positions of the separation pairs is selected at the time of the input.

9. Data input device according to claim 8, wherein one or more separating groove or separating line of a protrusion type is formed in the input selecting segment, and the input selecting segment is divided into left, middle, and right input selecting segments through the separating groove or separating line with the middle segment considered as the center of the input selecting segment.

10. Data, input device according to claim 9, wherein, in the input selecting segment, the separating groove or separating, line is wholly or partially formed in any one or more shapes of a straight line, a curve, and a wavy pattern, and is wholly or partially provided in a symmetric or asymmetric shape.

11. Data input device according to claim 8, wherein the input selecting segment is provided in a separated projection or a protruding frame shape.

12. Data input device according to claim 1, wherein the input module is provided in one of the followings: a holding type interface which is provided to a holder attachable to and detachable from the base; a detachable type interface which is provided in a form attachable to and detachable from the base; a wired type interface which is wiredly connected to the base; and a wireless type interface which is wirelessly connected to the base providing a display unit, or in a form that is installed in one of the interfaces.

13. Data input device according to claim 1, wherein the two or more input modules are provided at a predetermined position in the base.

14. Data input device according to claim 6, wherein two input modules are provided to predetermined positions of the base, and one or more of the separation input and the pair input are performed on the two input modules differently from or identically to each other.

15. Data input device according to claim 14, wherein the input modules are provided to allow one or more among characters, numbers, symbols, enter, mode change, and various function commands to be performed through the separation input or the pair input.

16. Data input device according to claim 1, wherein the input modules are provided to further comprise at least one of a separating groove, a separating line, a separated protrusion, and a protruding frame.

17. Data input device comprising:
an input unit which is provided to a base to allow data to be inputted;
an input module which comprises a separation sensing unit for sensing the input and generating an input signal corresponding to the input;
a memory which stores data assigned to the signal of the input made in the input module; and a controller which extracts data assigned to the input from the memory when the input signal is made in the input module, and then allows the extracted data to be inputted, characterized in that the input module is provided to comprise an input reference block within a selection area formed by one finger, wherein the input reference block is formed in such a manner that three A separated indication positions and three other B separated indication positions in A and B sides, which are separated from each other from a separation reference line, are arranged to face each other as only three A-B type separation pairs that are spaced from each other along the separation reference line, thereby being disposed in a rectangular form, on the input reference block, the three A-B type separation pairs are disposed within a contact area of a fingerprint region on a distal end of one thumb, that is, when the one thumb is placed on the input reference block, selection positions of the three A-B type separation pairs are recognized as left, central, and right positions of the fingerprint region on the distal end of the one thumb as well as a front and a rear of each of the left, central, and right positions, on the input reference block, a selection is made by a single input click performed with one finger, wherein one of the A and B separated indication positions in the A and B sides is individually selected by the single input click, and thus one data assigned to one input signal generated through the individual selection is inputted, or the separation reference line disposed between the A and B separated indication positions forming one A-B type separation pair is selected by the single input click, and thus one data assigned to two input signals generated through the selection of the A and B separated indication positions is inputted, wherein each of the single input clicks is made in a downward direction, and wherein the two input signals made on the input reference block through the selection is processed as one pair input, and when A and B separated indication positions selected together to make the pair input fail to come into contact with a predetermined sensor simultaneously, two signals corresponding to the A and B separated indication positions are sequentially generated and the controller determines the two signals as the pair input, based on a pre-set time value.

18. Data input device comprising:

two input modules which are provided to a base to allow data to be inputted;

a memory which stores data assigned to signals of the inputs made in the input modules; and a controller which extracts data assigned to the inputs from the memory when the input signals are made in the input modules, and then allows the extracted data to be inputted, characterized in that each of the input modules is provided to comprise an input reference block within a selection area formed by one finger, wherein the input reference block is formed in such a manner that three A separated indication positions and three other B separated indication positions in A and B sides, which are separated from each other from a separation reference line, are arranged to face each other as only three A-B type separation pairs that are spaced from each other along the separation reference line, thereby being disposed in a rectangular form, on the input reference block, the three A-B type separation pairs are disposed within a contact area of a fingerprint region on a distal end of one thumb, that is, when the one thumb is placed on the input reference block, selection positions of the three A-B type separation pairs are recognized as left, central, and right positions of the fingerprint region on the distal end of the one thumb as well as a front and a rear of each of the left, central, and right positions, on the input reference block, a selection is made by a single input click performed with one finger, wherein one of the A and B separated indication positions in the A and B sides is individually selected by the single input click, and thus one data assigned to one input signal generated through the individual selection is inputted, or the separation reference line disposed between the A and B separated indication positions forming one A-B type separation pair is selected by the single input click, and thus one data assigned to two input signals generated through the selection of the A and B separated indication positions is inputted, wherein each of the single input clicks is made in a downward direction, and wherein the two input signals made on the input reference block through the selection is processed as one pair input, and when A and B separated indication positions selected together to make the pair input fail to come into contact with a predetermined sensor simultaneously, two signals corresponding to the A and B separated indication positions are sequentially generated and the controller determines the two signals as the pair input, based on a pre-set time value.

* * * * *